US011901986B2

(12) United States Patent
Göransson

(10) Patent No.: US 11,901,986 B2
(45) Date of Patent: Feb. 13, 2024

(54) METHODS AND DEVICES FOR BEAMFORMING OPTIMIZATION

(71) Applicant: Telefonaktiebolaget LM Ericsson (publ), Stockholm (SE)

(72) Inventor: Bo Göransson, Sollentuna (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 262 days.

(21) Appl. No.: 17/602,830

(22) PCT Filed: Apr. 11, 2019

(86) PCT No.: PCT/SE2019/050335
§ 371 (c)(1),
(2) Date: Oct. 11, 2021

(87) PCT Pub. No.: WO2020/209768
PCT Pub. Date: Oct. 15, 2020

(65) Prior Publication Data
US 2022/0149907 A1     May 12, 2022

(51) Int. Cl.
  H04B 7/06      (2006.01)
  H04W 24/02     (2009.01)
  H04B 7/10      (2017.01)
(52) U.S. Cl.
  CPC ......... *H04B 7/0617* (2013.01); *H04B 7/0695* (2013.01); *H04W 24/02* (2013.01); *H04B 7/10* (2013.01)
(58) Field of Classification Search
  CPC ...... H04B 7/0617; H04B 7/0695; H04B 7/10; H04W 24/02
  See application file for complete search history.

(56) References Cited

U.S. PATENT DOCUMENTS 11,012,128 B2 *  5/2021  Wu ................... H04B 7/0626
2016/0241317 A1  8/2016  Piazzi et al.
(Continued)

OTHER PUBLICATIONS

Alcatel-Lucent, "R1-093331: Grid of Beams: A realization for downloadable codebooks," 3GPP TSG RAN WG1 #58 Meeting, Aug. 24-28, 2009, Shenzhen, China, 6 pages.
(Continued)

*Primary Examiner* — Jaison Joseph
(74) *Attorney, Agent, or Firm* — Withrow & Terranova, PLLC

(57) ABSTRACT

A method for providing signals for beam-formed transmission comprises retrieving, from a memory, of first vector-associated data defined by an obtained first beam index, assigned to a first signal, scheduled to be transmitted by beamforming in a first direction. The memory has vector-associated data characterizing at least two sets of beamforming vectors for each polarization and for each one of a plurality of beam directions. The beamforming vectors for each polarization and plurality of directions present different tapering and/or non-tapering. The first vector-associated data characterizes a first selected set of beamforming vectors that are designed to give a beam in the first direction. The first beam index comprises information for defining vector-associated data characterizing a particular one of the at least two sets for the first direction. A beamforming of the first signal is initiated by use of the first vector-associated data.

18 Claims, 23 Drawing Sheets

(56) References Cited

U.S. PATENT DOCUMENTS

| | | | |
|---|---|---|---|
| 2017/0331541 A1* | 11/2017 | Kang .................... | H04B 7/0469 |
| 2019/0097697 A1* | 3/2019 | Asplund .............. | H04J 11/0063 |
| 2020/0014434 A1* | 1/2020 | Onggosanusi ....... | H04B 7/0413 |
| 2022/0149907 A1* | 5/2022 | Göransson ........... | H04B 7/0695 |

OTHER PUBLICATIONS

Harris, Fredric, "On the Use of Windows for Harmonic Analysis with the Discrete Fourier Transform," Proceedings of the IEEE, vol. 66, Jan. 1978, pp. 51-83.

International Search Report and Written Opinion for International Patent Application No. PCT/SE2019/050335, dated Nov. 7, 2019, 14 pages.

* cited by examiner

METHODS AND DEVICES FOR BEAMFORMING OPTIMIZATION

This application is a 35 U.S.C. § 371 national phase filing of International Application No. PCT/SE2019/050335, filed Apr. 11, 2019, the disclosure of which is incorporated herein by reference in its entirety.

TECHNICAL FIELD

The proposed technology generally relates to beamforming of radio signals and in particular to methods and devices for scheduling and providing signals for beamformed transmission.

BACKGROUND

First implementations of beamforming of transmissions of radio signals for the mmWave spectrum, e.g. at 28 or 39 GHz, are based on analogue beamforming performed at Radio Frequency (RF). In this case, the beamforming network consists of phase shifter, or true time delay, elements and possible variable gain controllers for generating the beam from an antenna array. Normally, there is one beamforming network per polarization, if dual polarized, e.g. x-pol, antenna elements are used. The phase, and possibly gain, shifters are normally digitally controlled with a certain resolution. For example, a digitally controlled phase shifter can be controlled to $2^6=64$ different phase values. Similarly for the variable gain control element, it can be possible to set the gain to a fixed number of pre-defined values. By using the digital control almost any beam pattern can be created. A larger resolution, i.e. more bits for phase and gain control, will give a better fit of the created pattern relative a pattern generated by phase and gain elements with infinite resolution.

However, increasing the resolution, i.e. the number of control bits, also means that a higher interface capacity is needed. For example, if 128 antenna elements are assumed, each one equipped with a 6-bit digitally controlled phase shifter, and a 6-bit gain control this would mean a data amount of 6×6×128=4608 bits per beam. Assuming that a new beam could be applied every 10 µs would require a 500 Mbps interface for just beam weights. To avoid this high-speed interface, a predefined codebook is normally defined in the beamforming radio. A limited number of sets of beamforming vectors are pre-defined and then indexed in a look-up-table (LUT). By this, only one index is needed to point to the appropriate set of beamforming vectors in the LUT.

The beam table is normally defined so that beams are uniformly spread over a pre-defined service area. If 64 beams are used to cover a certain service area, 6 bits would be needed in an index to point towards one particular beam.

Similar problem with a very high rate beamforming weight control interface will also appear if a digital beamforming implementation is considered. In this case, the beams are created by multiplying the data stream to each antenna port with a complex number. In fact, here the interface capacity will, most likely, be even higher since each sub-carrier or group of sub-carriers, e.g. resource block, could have its own complex weight. If the beamforming is done after the Orthogonal Frequency-Division Multiplexing (OFDM) modulation, i.e. in time domain, the same weight will then be applied to all sub-carriers involved in this OFDM modulation. Hence, also in the case of digital beamforming (DBF) it is likely that a LUT is used to store the complex coefficient in the beamforming vectors.

The beams stored in the LUT can be designed in many different ways. One common method is to use so called Discrete Fourier Transform (DFT) beams, that is, beams generated from the basis vectors in a discrete Fourier transform. This will give beams with maximum gain and minimum beam width for the main lobe. This means that maximum Equivalent Isotropically Radiated Power (EIRP) is generated and hence DownLink (DL) coverage is maximized. This is very important when serving a single user over the complete carrier bandwidth. While DFT based beams maximize EIRP, they also have very high sidelobes. It can be shown that the un-tapered sidelobe level is −13 dB [0].

When several users are scheduled over different layers, i.e. different directions, a.k.a. Multi-User Multiple-Input Multiple-Output (MU-MIMO), the high side lobes of the Single-User Multiple-Input Multiple-Output (SU-MIMO) beams will limit the available Signal-to-Noise Ratio (SNR). The leakage between the beams are too large. For an un-tapered DTF codebook for a 32-element linear array, the main beam is very narrow, but at the same time the sidelobe level is as high as 13 dB below the main beam.

It is also known to taper the beam. For instance, if the beams are tapered with a Gaussian window, sidelobes as low as 42 dB below the main beam can be obtained. However, Gaussian tapering would cost approximately 3 dB in lower power and is therefore give a generally unacceptable performance for SU-MIMO cases.

From the above reason it is clear that neither tapered nor non-tapered beams are sufficient as such for obtaining a good performance of a mmWave system permitting MU-MIMO as well as SU-MIMO based on time-domain beamforming, after OFDM modulation. This is regardless if this is a digital or analog implementation.

SUMMARY

It is an object to provide beamforming being suitable for systems permitting MU-MIMO as well as SU-MIMO This and other objects are met by embodiments of the proposed technology.

According to a first aspect, there is provided a method for providing signals for beam-formed communication. The method comprises retrieving, from a memory, of first vector-associated data defined by an obtained first beam index. The first beam index is assigned to a first signal. The first signal is scheduled to be communicated by beamforming in a first direction. The memory has stored therein vector-associated data characterizing at least two sets of beamforming vectors for each polarization and for each one of a plurality of beam directions. The at least two sets of beamforming vectors for each polarization and for each one of a plurality of directions present different tapering and/or non-tapering. The first vector-associated data characterizes a first selected set of beamforming vectors that are designed to give a beam in the first direction. The first beam index comprises information for defining vector-associated data characterizing a particular one of the at least two sets of beamforming vectors for the first direction. A beamforming for the first signal is initiated by use of the first vector-associated data characterizing the first selected set of beamforming vectors.

According to a second aspect, there is provided a method for scheduling signals for beam-formed communication. The method comprises selecting of a first set of beamforming vectors among at least two first sets of beamforming vectors. The first set of beamforming vectors corresponds to a highest estimated total throughput for a first signal to be scheduled for beamformed communication in a first direction under intended prevailing radio conditions. The at least two first sets of beamforming vectors are designed to give a beam in the first direction for a given polarization. The at least two first sets of beamforming vectors present different tapering and/or non-tapering. A transmission of a first beam index assigned to the first signal is initiated. The first beam index defines the first selected set of beamforming vectors.

According to a third aspect, there is provided a radio frequency unit configured to provide signals for beamformed communication. The radio frequency unit is configured to retrieve, from a memory, first vector-associated data defined by an obtained first beam index. The first beam index is assigned to a first signal. The first signal is scheduled to be communicated by beamforming in a first direction. The memory has stored therein vector-associated data characterizing at least two sets of beamforming vectors for each polarization and for each one of a plurality of beam directions. The at least two sets of beamforming vectors for each polarization and for each one of a plurality of directions present different tapering and/or non-tapering. The first vector-associated data characterizes a first selected set of beamforming vectors that is designed to give a beam in the first direction. The first beam index comprises information for defining vector-associated data characterizing a particular one of the at least two sets of beamforming vectors for the first direction. The radio frequency unit is further configured to initiate a beamforming for the first signal by use of the vector-associated data characterizing the first selected set of beamforming vectors.

According to a fourth aspect, there is provided a network node configured to schedule signals for beamformed communication. The network node is configured to select a first set of beamforming vectors among at least two first sets of beamforming vectors. The first set of beamforming vectors corresponds to a highest estimated total throughput for a first signal to be scheduled for beamformed communication in a first direction under intended prevailing radio conditions. The at least two first sets of beamforming vectors are designed to give a beam in the first direction for a given polarization. The at least two first sets of beamforming vectors present different tapering and/or non-tapering. The network node is further configured to initiate a transmission of a first beam index assigned to the first signal. The first beam index defines the first selected set of beamforming vectors.

According to a fifth aspect, there is provided a wireless communication system comprising at least one radio frequency unit according to the third aspect and at least one network node according to the fourth aspect.

According to a sixth aspect, there is provided a computer program comprising instructions, which when executed by at least one processor, cause the processor(s) to retrieve, from a memory, first vector-associated defined by an obtained first beam index. The first beam index is assigned to a first signal. The first signal is scheduled to be communicated by beamforming in a first direction. The memory has stored therein vector-associated data characterizing at least two sets of beamforming vectors for each polarization and for each one of a plurality of beam directions. The at least two sets of beamforming vectors for each polarization and for each one of a plurality of directions presenting different tapering and/or non-tapering. The first vector-associated data characterizes a first selected set of beamforming vectors that is designed to give a beam in the first direction. The first beam index comprises information for defining vector-associated data characterizing a particular one of the at least two sets of beamforming vectors for the first direction. The instructions, when executed by the processor(s), further cause the processor(s) to initiate a beamforming for the first signal by use of the first vector-associated data characterizing the first selected set of beamforming vectors.

According to a seventh aspect, there is provided a computer program comprising instructions, which when executed by at least one processor, cause the processor(s) to select a first set of beamforming vectors among at least two first sets of beamforming vectors. The first set of beamforming vectors corresponds to a highest estimated total throughput for a first signal to be scheduled for beamformed communication in a first direction under intended prevailing radio conditions. The at least two first sets of beamforming vectors are designed to give a beam in the first direction for a given polarization. The at least two first sets of beamforming vectors present different tapering and/or non-tapering. The instructions, when executed by the processor(s), further cause the processor(s) to initiate a transmission of a first beam index assigned to the first signal. The first beam index defines the first selected set of beamforming vectors.

According to an eighth aspect, there is provided a computer-program product comprising a computer-readable medium having stored thereon a computer program of the sixth or seventh aspect.

An advantage of the proposed technology is that the same beam indication and calculation method can be used regardless of SU- or MU-MIMO scheduling and at the same time beam weights suitable for respective option can be defined or calculated Other advantages will be appreciated when reading the detailed description.

BRIEF DESCRIPTION OF THE DRAWINGS

The embodiments, together with further objects and advantages thereof, may best be understood by making reference to the following description taken together with the accompanying drawings, in which.

DETAILED DESCRIPTION

Throughout the drawings, the same reference designations are used for similar or corresponding elements.

For a better understanding of the proposed technology, it may be useful to again consider presently available beamforming principles.

Figure 1:
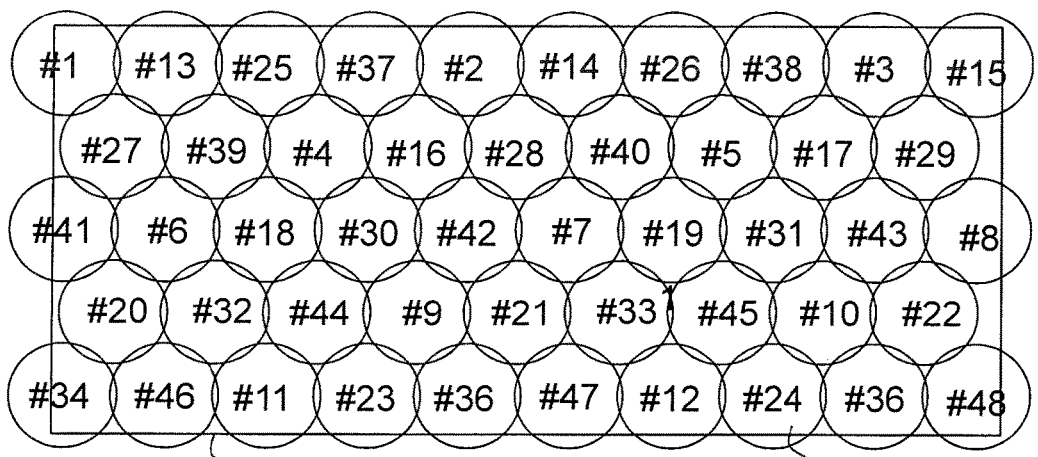
FIG. 1 is an example of beams generated by a LUT of beam indices.

As mentioned above, the beam table is normally defined so that beams are uniformly spread over a pre-defined service area. FIG. 1 gives an example of available beams covering a certain area. Here 48 beams 22 are used to together cover a certain service area 21. If MU-MIMO is to be applied, the sidelobe of one used beam may interfere with the other used beam.

As an example, if beams #30 and #21 are to be used for two different users, they may interfere strongly with each other by their respective sidelobes. However, if beams #22 and #27 are to be used, the interference may be neglectable, or at least much smaller, due to the difference in beam directions.

Figure 2A:
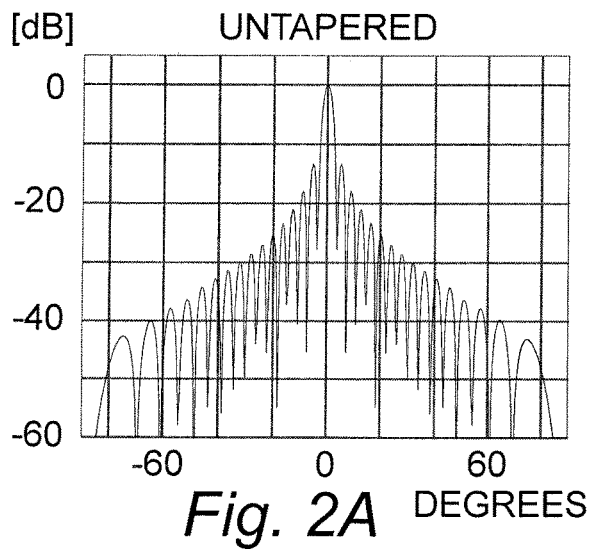
FIG. 2A is an example of one beam of a 1D DFT codebook.
Figure 2B:
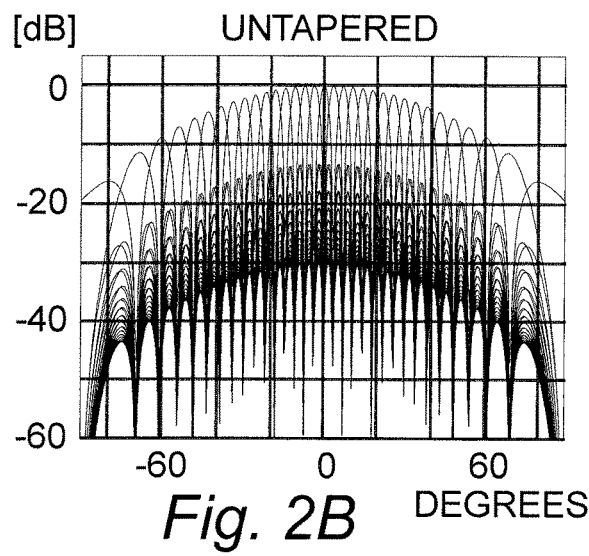
FIG. 2B is an example of all beams of a 1D DFT codebook.

FIG. 2A shows an example of an un-tapered DFT beam for a 32-element linear array, i.e. a 1D array. It can be noted that the main beam is very narrow, but also the high sidelobe level (−13 dB). Even at a direction difference of 60 degrees, the sidelobe level is still around −40 dB. This general behavior is valid for the entire un-tapered DFT codebook, as illustrated in FIG. 2B.

Figure 2C:
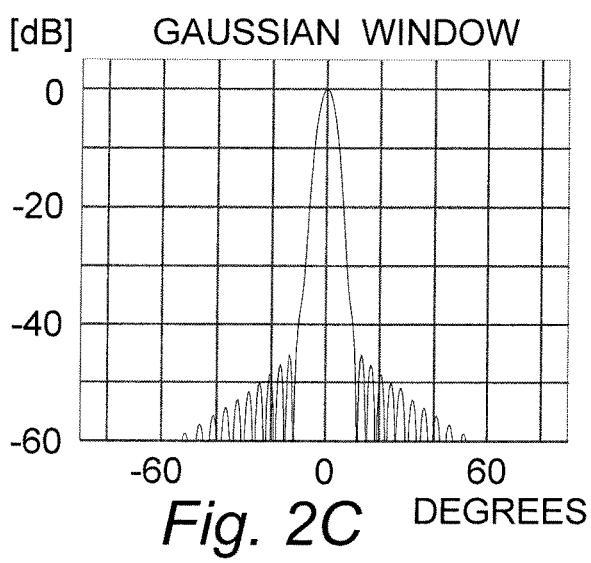
FIG. 2C is an example of one beam after tapering with a Gaussian window.
Figure 2D:
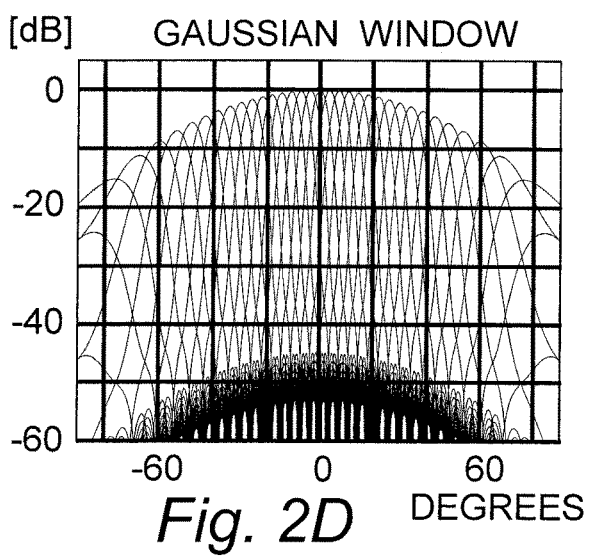
FIG. 2D is an example of all beams after tapering with a Gaussian window.

FIG. 2C shows an example of a beam tapered with a Gaussian window. In this case the sidelobes are much lower. However, the main lobe is much wider. By this, EIRP in the pointing direction is traded for lower side lobes. This general behavior is valid for the entire Gaussian window tapered codebook, as illustrated in FIG. 2D. Using 2 beams from the Gaussian tapered codebook for MU-MIMO scheduling would decrease the inter beam interference considerably compared with the untapered codebook. The sidelobes in this case is less than 42 dB below main beam. It should also be noted, though not visible in the Figures, that a considerably gain penalty is associated with the tapering. A Gaussian tapering would cost approximately 3 dB in lower power, see e.g. Fredric J. Harris, "On the Use of Windows for Harmonic Analysis with the Discrete Fourier Transform", Proceedings of the IEEE, vol. 66, no. 1, January 1978.

From the above it is clear that Gaussian tapered beams are not appropriate choices for SU-MIMO. The wider main lobe and power loss would give much worse performance than non-tapered (or untapered) DFT beams. On the other hand, non-tapered beams have too high side lobes for being applicable to MU-MIMO scheduling.

To counteract the problem described above it is here proposed to enable a choice between at least two different beamforming vectors for each direction and polarization. Typically, one untapered and one tapered set of beamforming vectors is available for each direction and each polarization. Depending on the predicted prevailing radio conditions during the coming transmission, a scheduler may estimate which one of the sets that will give the highest total throughput. Typically, when SU-MIMO is to be employed, untapered beamforming vectors are selected, and when MU-MIMO is to be scheduled, tapered beamforming vectors are selected. However, there may be situations where such division is not valid, e.g. if the users are situated enough far from each other to be able to handle the interference situation of untapered beams with an estimated total throughput exceeding the one estimated for tapered beams.

In the normal random access and beam selection process each user will be allocated a preferred beam from the beam table, being associated with a certain direction. This procedure is well known in prior art and is part of the beam management procedure described by $3^{rd}$ Generation Partnership Project (3GPP) protocols.

Figure 3A:
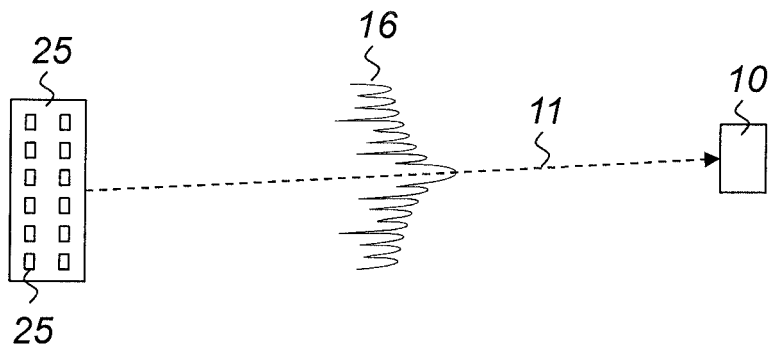
FIG. 3A is an illustration of an example of a beamformed signaling in a SU-MIMO situation.

In FIG. 3A an example of a beamformed signaling in a SU-MIMO situation is illustrated. An Antenna 25 having antenna elements 29 is configured for providing beamformed signals. A UE 10 is situated in a first direction 11 relative to the antenna 25. A first signal 16 is transmitted in a beamformed manner in the first direction 11.

In the scheduler, the served cell traffic can be calculated assuming SU-MIMO scheduling of two users. In addition, the total throughput for MU-MIMO scheduling using tapered beams can be calculated, typically with lower EIRP and lower beam leakage. The radio frequency unit has then to be informed about the best solution in order to be able to find the suitable beamforming vectors.

Figure 3B:
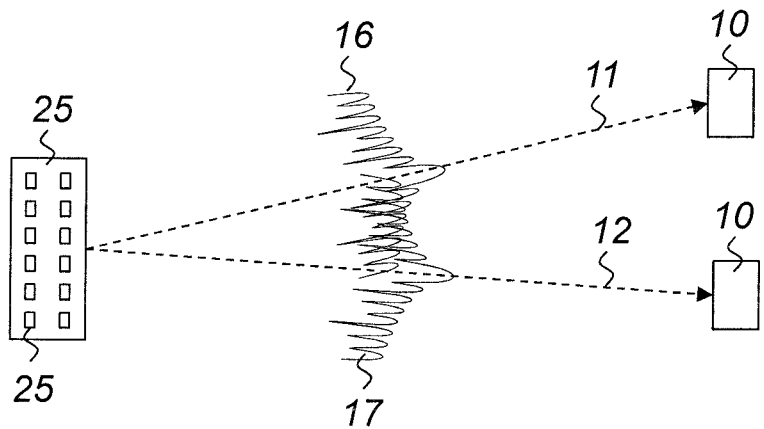
FIG. 3B is an illustration of an example of a beamformed signaling in a MU-MIMO situation using untapered beamforming.

In FIG. 3B an example of a beamformed signaling in a MU-MIMO situation is illustrated. Two UEs 10 are situated in a first direction 11 and a second direction 12, respectively, relative to the antenna 25. A first signal 16 is transmitted in a beamformed manner in the first direction 11 and a second signal 17 is transmitted in a beamformed manner in the second direction 12. In this example, the signals 16 and 17 are beamformed in an untapered manner. The sidelobes of the first signal 16 causes high interference with the second signal 17 and the sidelobes of the second signal 17 causes high interference with the first signal 16.

Figure 3C:
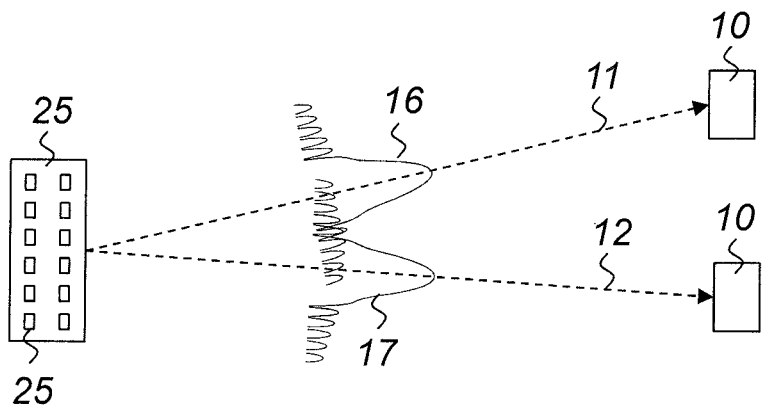
FIG. 3C is an illustration of an example of a beamformed signaling in a MU-MIMO situation using beamforming tapered with a Gaussian window.

In FIG. 3C an example of another beamformed signaling in a MU-MIMO situation is illustrated. Here, the signals 16 and 17 are beamformed tapered with a Gaussian window. The interference between the first and second signals 16, 17 is here considerably reduced. However, as mentioned above, a gain penalty is associated with the tapering. Still, the estimated total throughput would be improved over the situation in FIG. 3B.

Figure 4A:
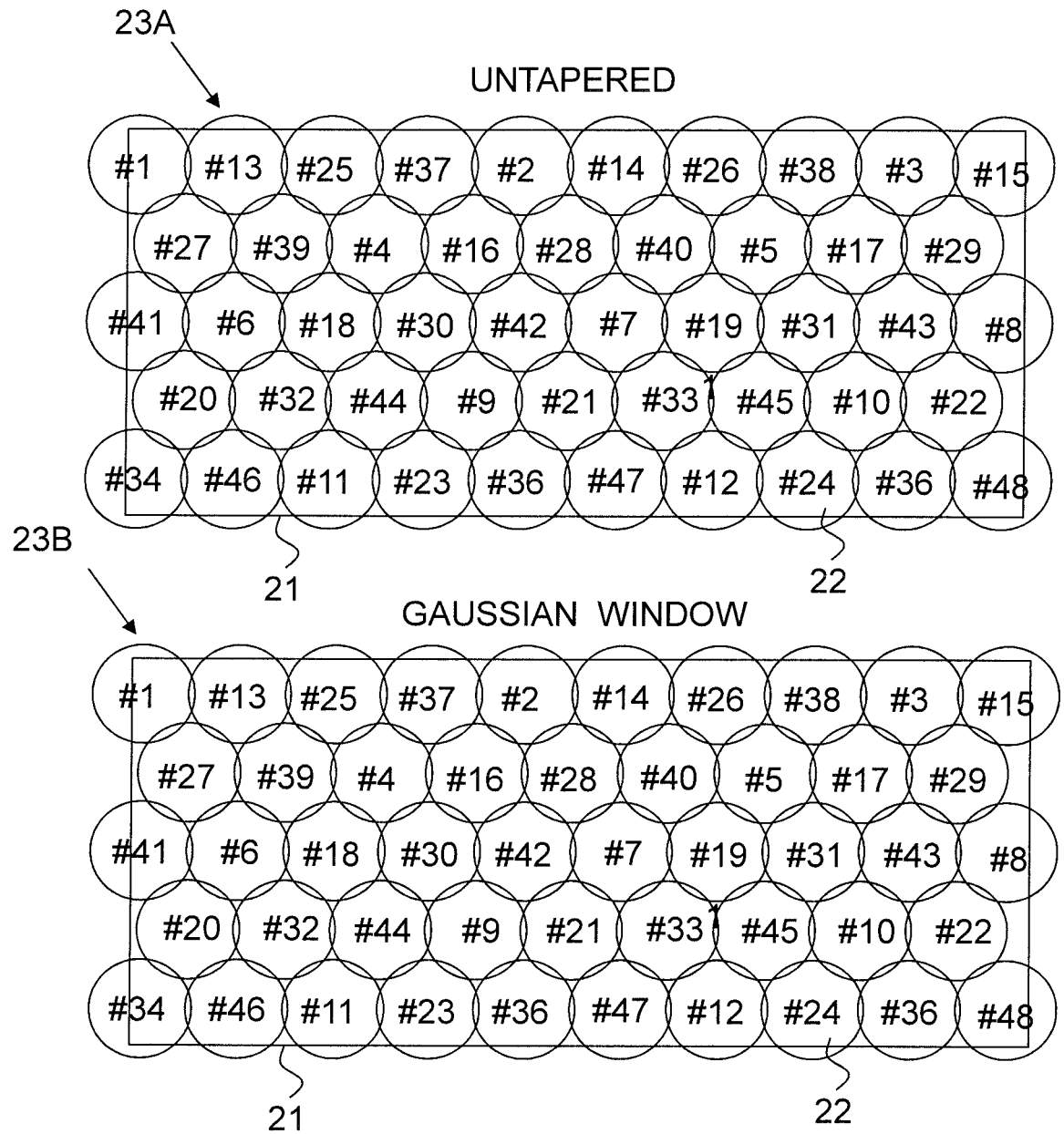
FIG. 4A is an example of beams generated by a LUT of beam indices, having two sets for each direction.

One embodiment to solve this is to provide an additional bit added in the beam weight protocol. This bit will indicate if SU- or MU-MIMO scheduling take place, or in a general case which one of the at least two sets of beamforming vectors that is supposed to be used. If MU-MIMO scheduling is preferred, the beam index for respective user will be sent to the radio together with a bit (the additional bit) indicating MU-MIMO/SU-MIMO scheduling. By this the radio frequency unit can pick beamforming vectors from the appropriate part of the LUT. This is illustrated in FIG. 4A. Here, two complete partitions of beamforming vectors for different directions are provided; a first partition 23A comprising untapered beams and a second partition 23B comprising Gaussian window tapered beams. The additional bit then refers to which one of the two groups to use.

Figure 4B:
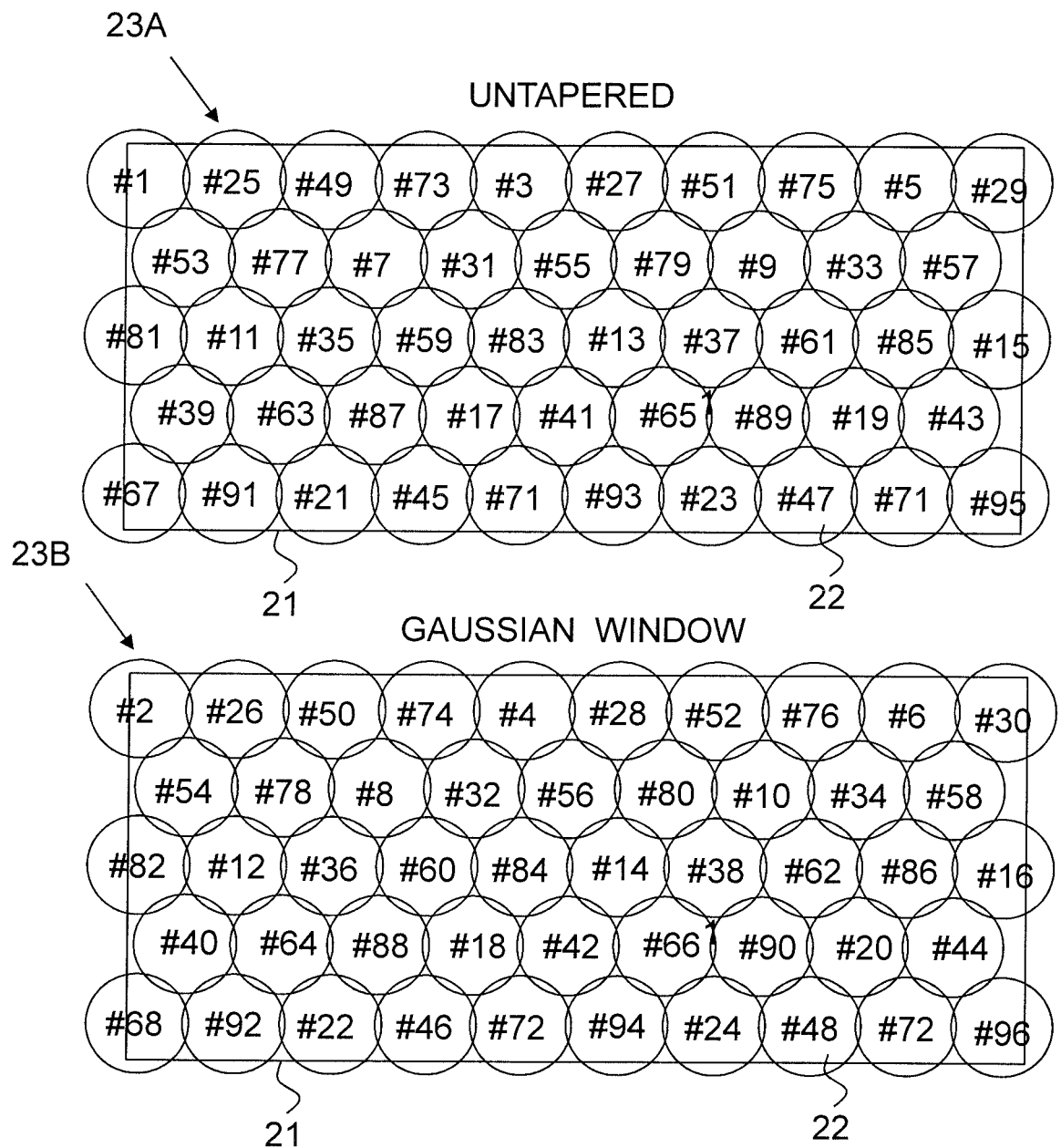
FIG. 4B is another example of beams generated by a LUT of beam indices, having two sets for each direction.

Of course, the additional bit can also be used for extending the index range, giving each set of beamforming vectors its own unique index, as illustrated in FIG. 4B.

In a digital implementation, it is acknowledged that the tapered beam weights can be calculated in the digital radio. The un-tapered SU-MIMO weights are then stored in the LUT. When the radio receives the MU-MIMO scheduling indicator, it will apply an appropriate window function on the beam weights stored in the LUT. The preferred implementation will be dependent on cost for larger memory vs cost for applying the window function.

Figure 5:
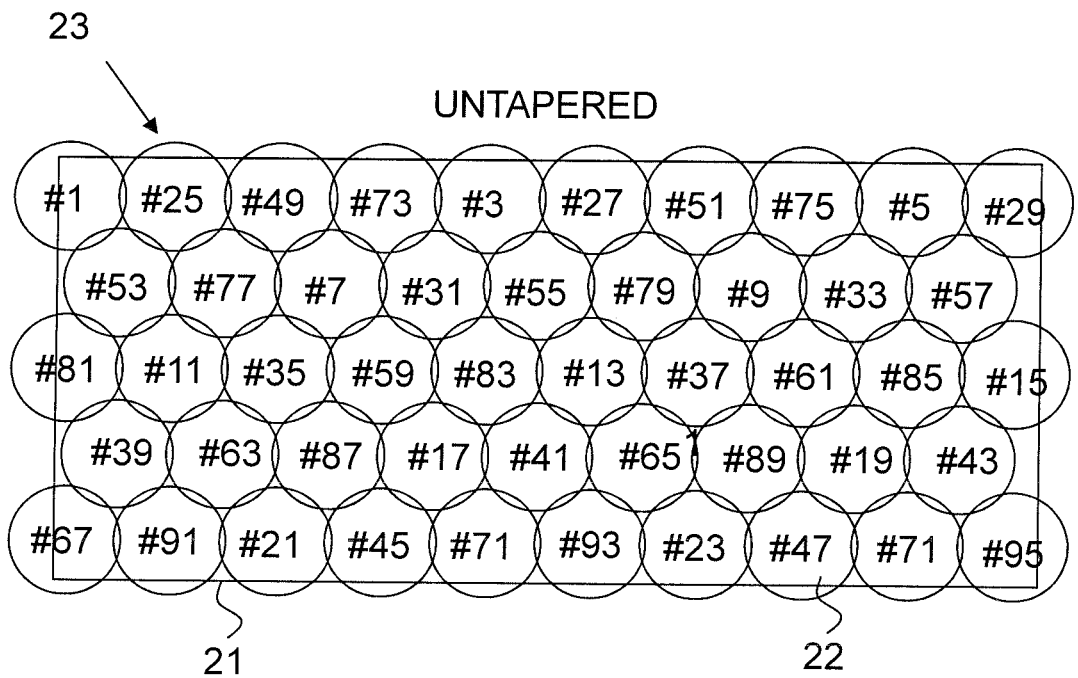
FIG. 5 is another example of beams generated by a LUT of beam indices, and additional Gaussian window tapering information.

FIG. 5 illustrates the information stored in a retrievable manner for the digitally implemented digital radio frequency unit. In case of SU-MIMO, the radio frequency unit will receive an index, having a part index defining that SU-MIMO is intended. The radio frequency unit then retrieves the appropriate beamforming vector from the single partition 23 in the LUT. In case of MU-MIMO, the radio frequency unit will receive an index, having a part index defining that MU-MIMO is intended. The radio frequency unit then retrieves the appropriate beamforming vector from the single partition 23 in the LUT as well as tapering information 24, e.g. concerning a Gaussian window tapering.

The provision of an additional group of beamforming vector sets can of course be further generalized to more than two groups. In one embodiment, one group could comprise untapered beamforming vectors, while the other groups comprise beamforming vectors tapered by different kinds of techniques. This will be further discussed further below.

Figure 6:
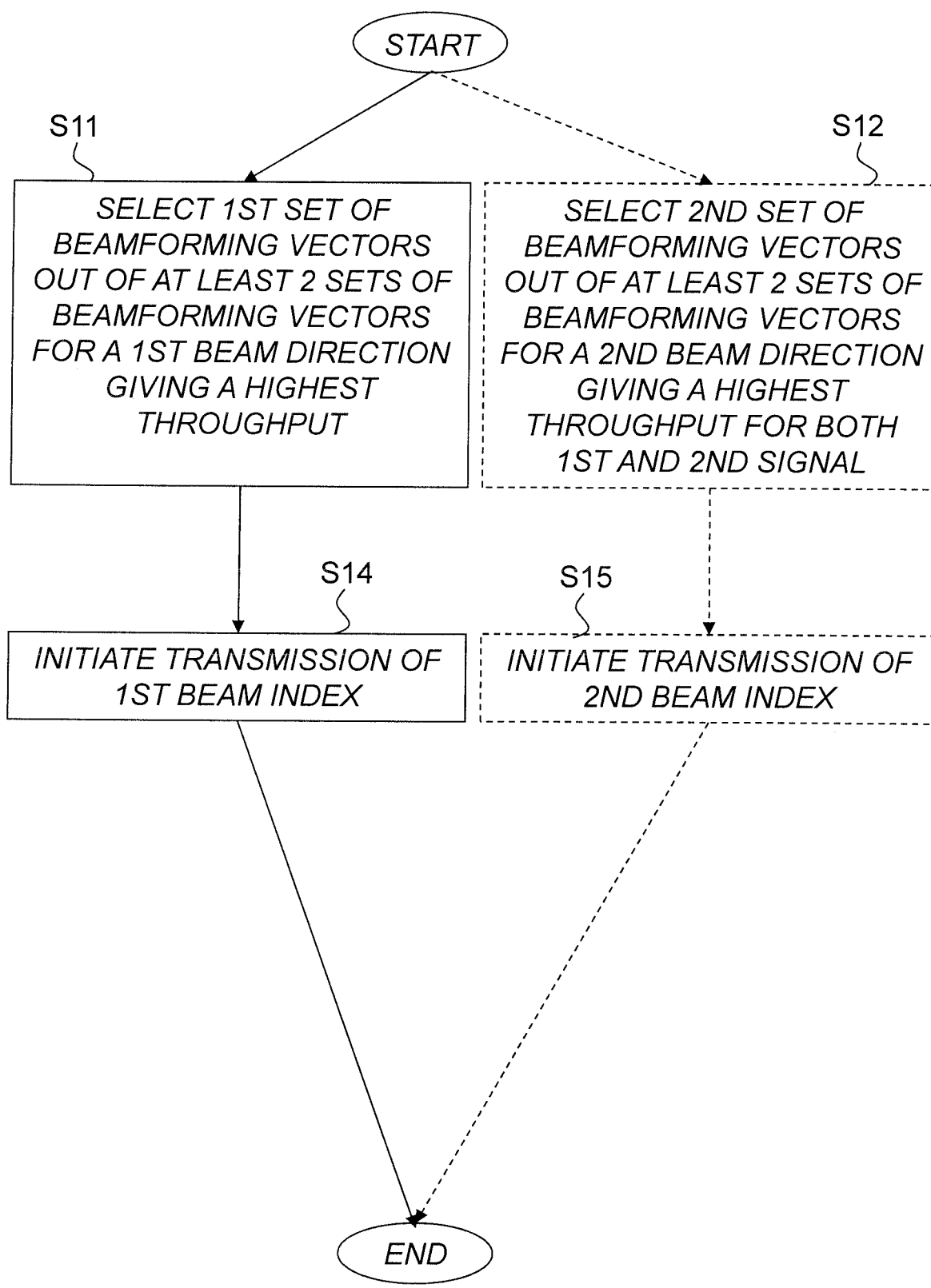
FIG. 6 is a schematic flow diagram illustrating steps of an embodiment of a method for scheduling signals for beamformed transmission.

FIG. 6 is a schematic flow diagram illustrating steps of an embodiment of a method for scheduling signals for beamformed communication. In step S11, a first set of beamforming vectors is selected among at least two first sets of beamforming vectors. The first set of beamforming vectors corresponding to a highest estimated total throughput for a first signal to be scheduled for beamformed communication in a first direction under intended prevailing radio conditions. The at least two first sets of beamforming vectors are designed to give a beam in the first direction for a given polarization. The at least two first sets of beamforming vectors present different tapering and/or non-tapering. For instance, if SU-MIMO is found to be the most efficient transmission or reception strategy, untapered beamforming vectors are probably selected.

In step S14, a transmission of a first beam index assigned to the first signal is initiated. The first beam index defines the first selected set of beamforming vectors.

As discussed above, in one embodiment, the beam index has a part beam index defining if the beamforming is a single-user beamforming or a multi-user beamforming.

In a further embodiment, the single-user beamforming is a beamforming using beamforming vectors without tapering and the multi-user beamforming is a beamforming using beamforming vectors with tapering.

In the situation where MU-MIMO is decided to be the most efficient, two more steps are to be performed. In step S12, a second set of beamforming vectors are selected among at least two second sets of beamforming vectors. The second set of beamforming vectors corresponding to a highest estimated total throughput for the first signal and for a second signal to be scheduled for beamformed communication in the first direction and a second direction, respectively, under intended prevailing radio conditions. The second direction is different from the first direction. The second signal is scheduled for beamformed communication simultaneously as the first signal by a same antenna using a same physical resource. The at least two second sets of beamforming vectors are designed to give a beam in the second direction for a given polarization. The at least two second sets of beamforming vectors present different tapering and/or non-tapering. In step S15 a transmission of a second beam index assigned to the second signal is initiated. The second beam index defines the second selected set of beamforming vectors.

This method is typically performed in a network node. Preferably, this process is incorporated in the baseband operations. The transmission of the first signal and first beam index and optionally of the second signal and the second beam index typically transfers the beamforming information to a radio frequency unit.

Figure 7:
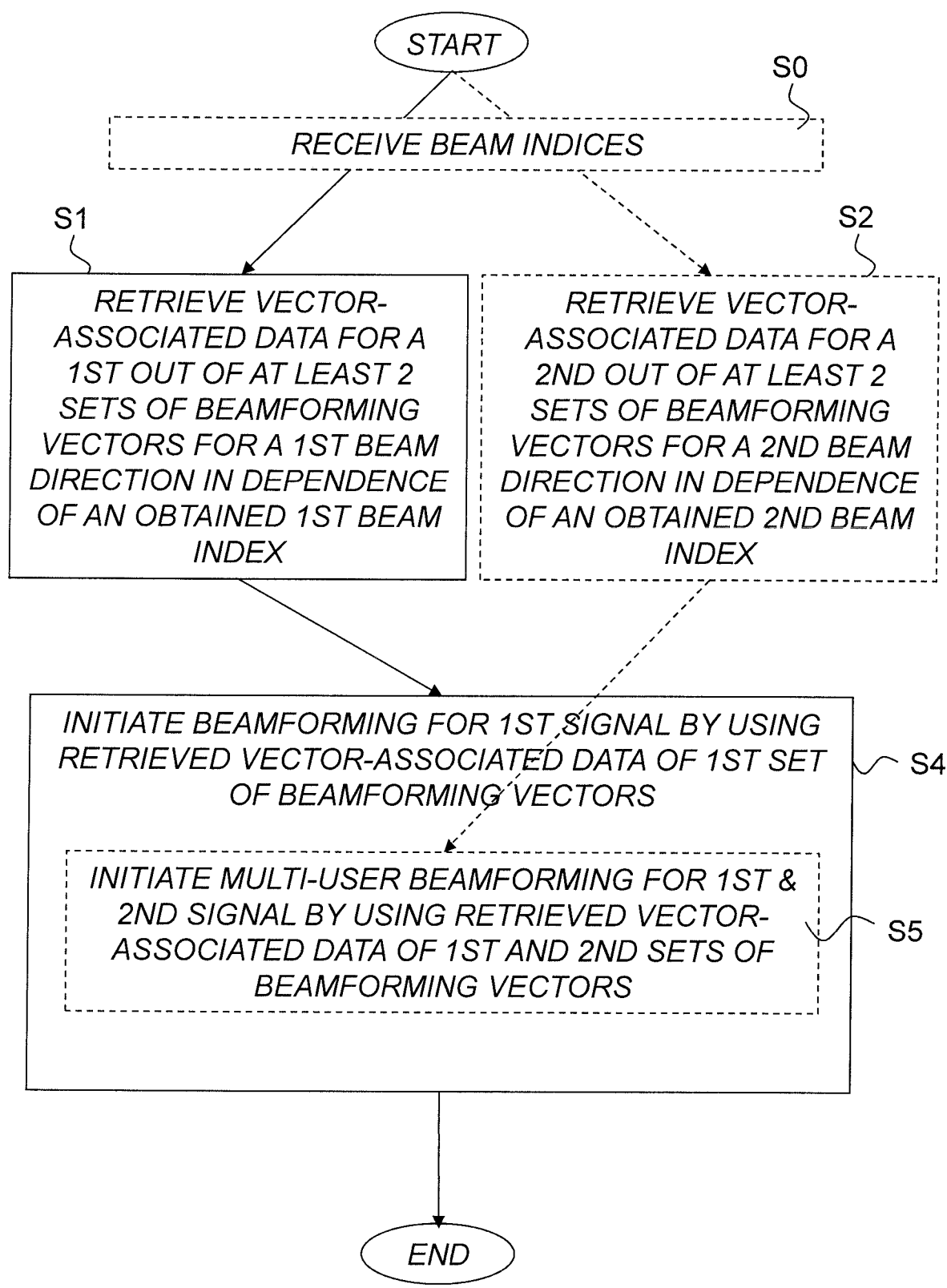
FIG. 7 is a schematic flow diagram illustrating steps of an embodiment of a method for providing signals for beamformed transmission.

In the radio frequency unit, signals for beamformed transmission are provided. FIG. 7 is a schematic flow diagram illustrating steps of an embodiment of a method for providing signals for beam-formed communication. In step S1, first vector-associated data defined by an obtained first beam index is retrieved from a memory. The first beam index is assigned to a first signal. The first signal is scheduled to be communicated by beamforming in a first direction. The memory having stored therein vector-associated data characterizing at least two sets of beamforming vectors for each polarization and for each one of a plurality of beam directions. The at least two sets of beamforming vectors for each polarization and for each one of a plurality of directions present different tapering and/or non-tapering. The first vector-associated data characterize a first selected set of beamforming vectors, being designed to give a beam in the first direction. The first beam index comprises information for defining vector-associated data characterizing a particular one of the at least two sets of beamforming vectors for the first direction.

In step S4, a beamforming for the first signal by use of the first vector-associated data characterizing the first selected set of beamforming vectors is initiated.

For SU-MIMO, these steps are the only required ones.

In one embodiment, the first beam index is obtained by receiving the first beam index from a network node, as illustrated by step S0. In the case of MU-MIMO, also the second beam index is obtained by receiving the second beam index from a network node.

For MU-MIMO situations, also the second signal has to be considered. Therefore, in step S2, second vector-associated data defined by an obtained second beam index is retrieved from the memory. The second beam index is assigned to a second signal. The second signal is scheduled to be communicated by beamforming in a second direction. The second direction is different from the first direction. The second signal is scheduled to be communicated simultaneously as the first signal by a same antenna using a same physical resource. The second vector-associated data characterizes a second selected set of beamforming vectors, being designed to give a beam in the second direction. The second beam index comprises information for defining vector-associated data characterizing a particular one of the at least two sets of beamforming vectors for the second direction.

Thereby, the step S4 of initiating a beamforming comprises the part step S5, in which a multi-user beamforming for the first and second signals by use of the first and second vector-associated data characterizing the first and second selected sets of beamforming vectors is initiated.

As indicated above, in one embodiment, the beam index has a part beam index defining a partition of the data characterizing the sets of beamforming vectors of the memory, which partition is associated with vector-associated data of only one set of beamforming vectors for each polarization and for each one of a plurality of directions.

In one embodiment, the part beam index defines if the beamforming is a single-user beamforming or a multi-user beamforming.

In a further embodiment, a partition defined by a part beam index associated with a single-user beamforming comprises vector-associated data characterizing sets of beamforming vectors without tapering and a partition defined by a part beam index associated with a multi-user beamforming comprises vector-associated data characterizing sets of beamforming vectors with tapering.

The vector-associated data can be structured in different ways. In a most general case, each antenna element is associated with its individual phase shift and its individual intensity modulation. Therefore, vector-associated data can be structured is such a direct manner, characterizing sets of beamforming vectors comprises data defining phase shifts and intensity modulation for each antenna element.

In some embodiments, no intensity modulation is performed at all, only phase shifts. In such cases, the intensity modulation can be defined as being pre-determined to be constant, and only the different phase shifts are tabulated.

In many cases of tapering of a beam, the phase shift is not altered at all. Instead, only the intensity modulation is altered compared to the untapered version. Therefore in one embodiment, the vector-associated data characterizing the at least two sets of beamforming vectors has a common set of phase shifts for each direction and separate data defining different intensity modulations for the at least two sets of beamforming vectors.

Tapering as a general term is to weight the elements of a beamforming vector with a phase and amplitude value. In most cases, as mentioned briefly above, only amplitude tapering is considered while the phase then is considered as a part of the beamforming weight. Amplitude tapering over the array is defined as to apply amplitude (or power) according to a window function. In the present disclosure, "untapered" and "non-tapered" are used as synonyms. In the present disclosure, untapered beams are beams achieved by use of a beamforming algorithm aiming at a narrow beam without sidelobe considerations. Analogously, a "tapered" beamforming vector is considered as a beamforming vector where at least the amplitudes are modified according to a window function.

In a preferred embodiment, the tapering is an amplitude tapering.

Figure 8:
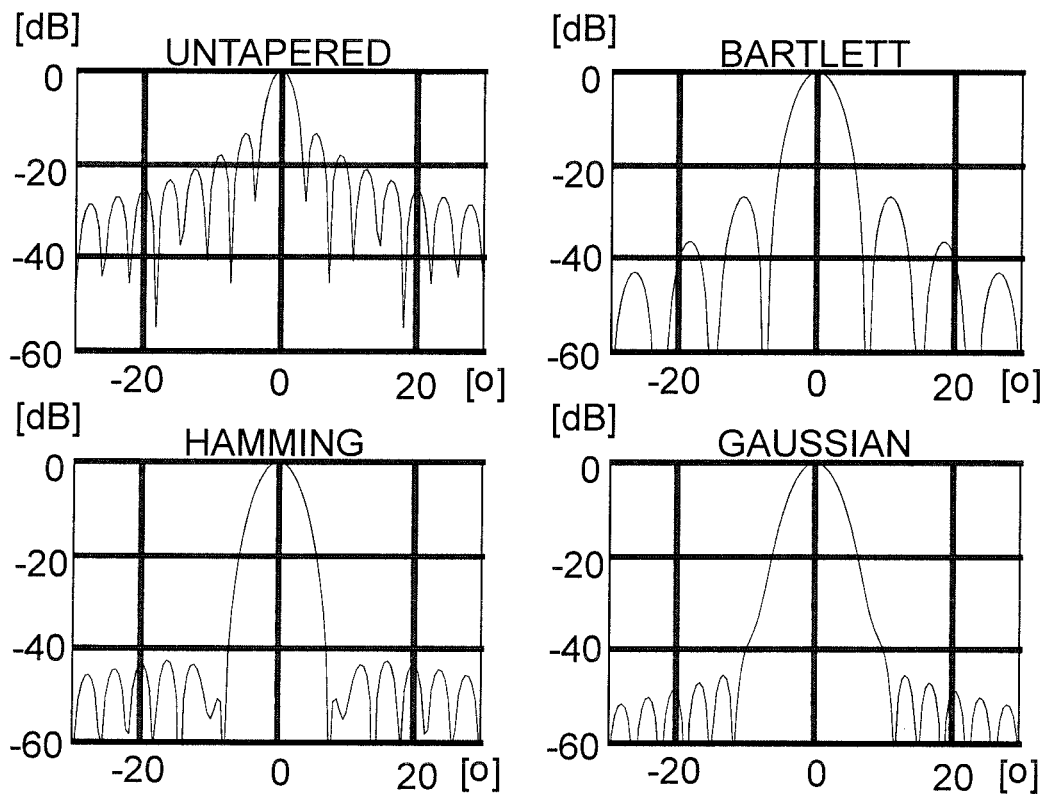
FIG. 8 illustrates an untapered signal and signals tapered according to different techniques.

Furthermore, note that the Gaussian window described above is just one example of a tapering method. Depending on the compromise between sidelobe suppression and power loss a number of well-known windowing functions can be used. FIG. 8 illustrates a few examples of different tapering methods. Besides the untapered beam version, examples of tapering with a Bartlett widow, a Hamming window and a Gaussian window are illustrated. Here the trade-off between main lobe width and side lobe level is easily visible.

In embodiments where more than two sets of beamforming vectors are used, a first one may correspond to an untapered beam and the others may correspond to different types of tapering. The selection can then be based e.g. on the difference in directions between the first and second directions, obtaining the most favorable tapering approach at that specific set of directions.

The degree of tapering and/or the used window function may depend on how the lobes are positioned relative to each other. For instance, if the lobes are close, an extensive tapering may be useful. If the lobes on the other hand are well separated, the tapering may be more gently or not being applied at all. The degree of tapering may be selected depending on how the users are scheduled.

As an example, if two users are scheduled, a suitable tapering is calculated at the same time. This selected tapering is signaled to the radio frequency unit in connection with the beamforming index, which enables the radio frequency unit to apply the correct tapering. More than two LUTs with a respective set of beamforming vectors can be provided at the radio frequency unit, or a basic untapered beamforming vector set can be provided accompanied with different tapering instructions. This is thus in analogy with FIGS. 4A-B and 5, applied to more than two sets.

Figure 9:
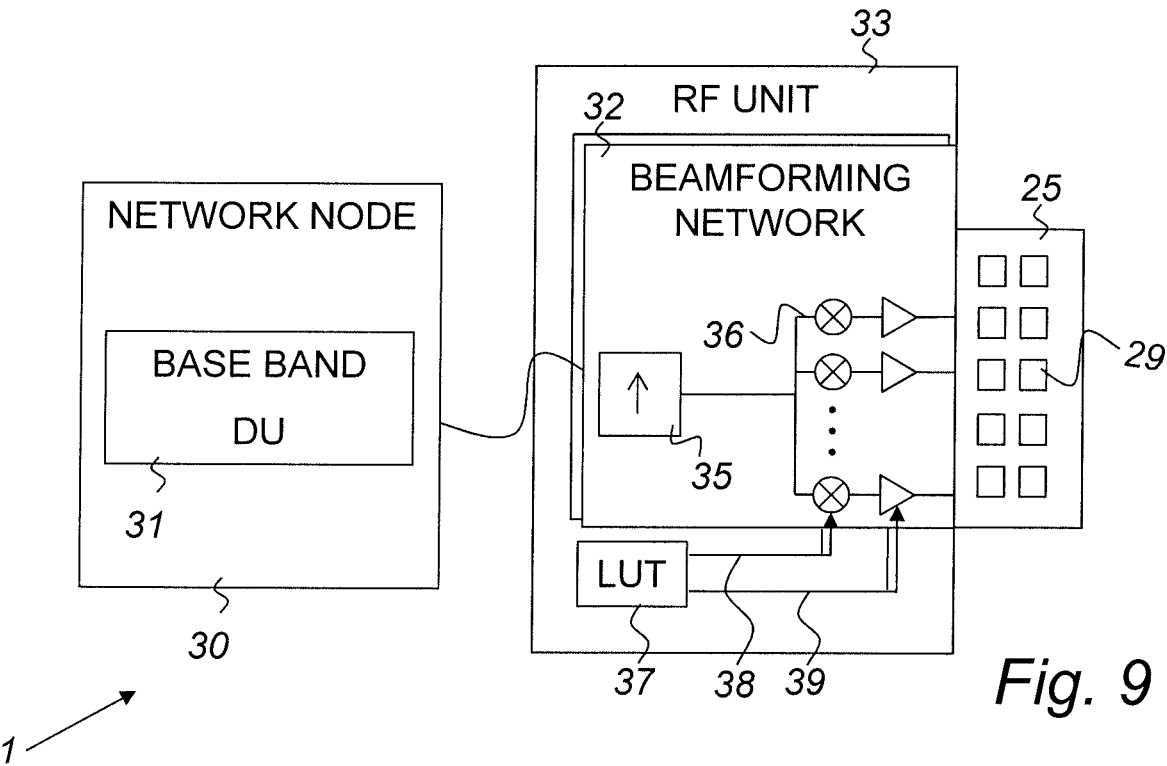
FIG. 9 illustrates schematically a SU-MIMO beamforming system.

A typical system design for a wireless communication system 1, in this embodiment a mmWave system, is depicted in FIG. 9. User signals are generated in a baseband unit 31 (digital unit—DU) of a network node 30 and are sent to the radio unit 33 for up-conversion to radio frequency (RF) in a converter 35. In a beamforming (BF) network 32, the up-converted signals are distributed to the phase-shifters and power amplifiers (PA) of antenna element branches 36, one for each antenna element 29 of the antenna array 25. The phase and amplitude (gain) values needed to generate a specific beam are stored in a lookup table (LUT) 37. The index corresponding to the correct weights is sent from baseband 31 together with data for each user. The phase values 38 are used to control a respective phase-shifter and the amplitude values 39 are used to a respective PA.

Normally the system operates with a dual-polarized antenna array, and hence there is one beamforming network 32 per polarization, as indicated in the Figure.

Figure 10:
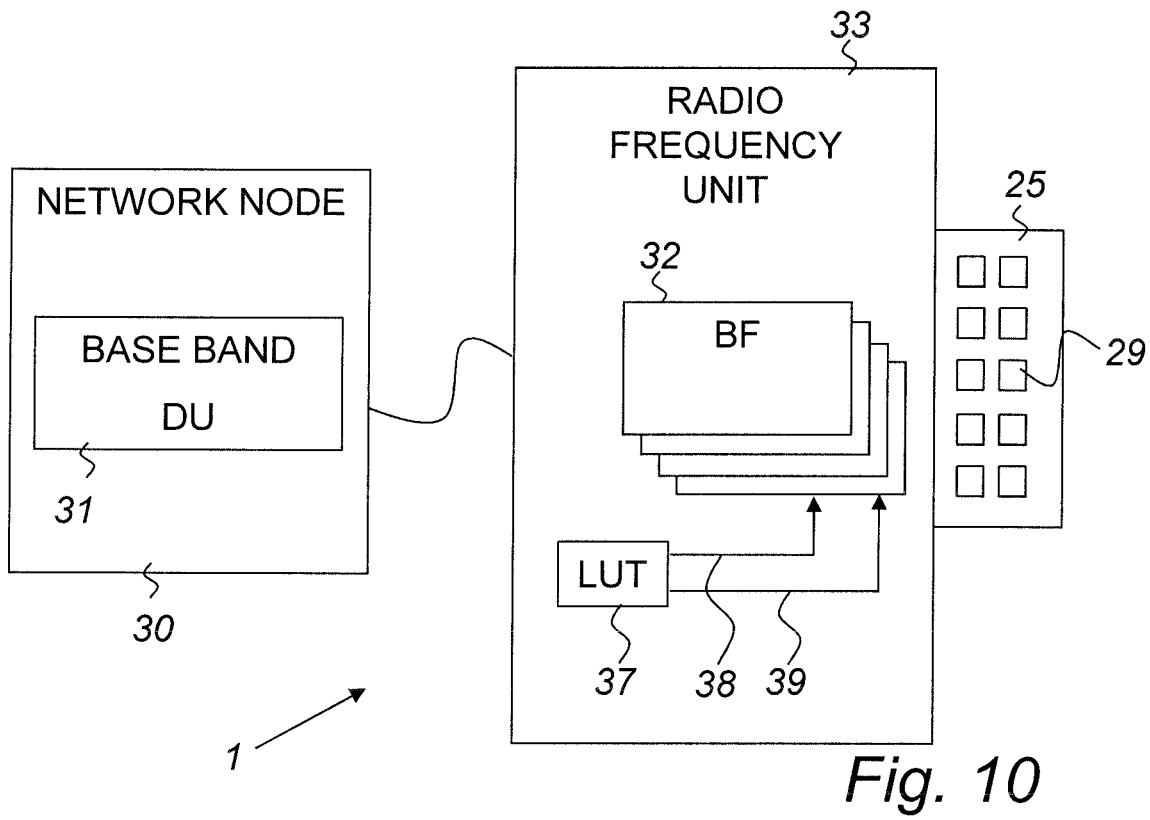
FIG. 10 illustrates schematically a MU-MIMO beamforming system.

When MU-MIMO scheduling is done, that is, two (or more) users are scheduled on the same resource, there will be two beamforming networks per polarization as indicated in FIG. 10. Here there is one BF network 32 per layer for each polarization.

Figure 11:
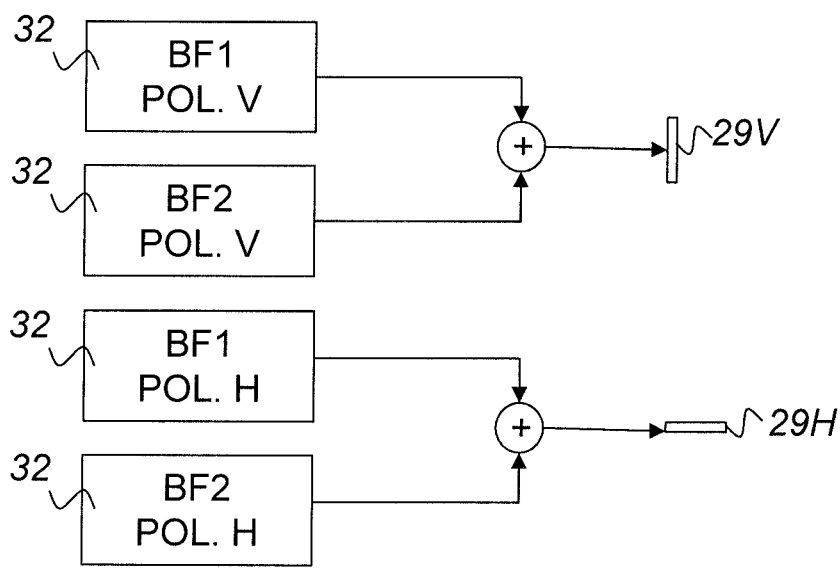
FIG. 11 illustrates schematically an antenna output of a MU-MIMO beamforming system.

The beamformed signals are then summed onto the same antenna element as indicated in FIG. 11. The beamformed signals for the vertical polarization of a first and second signal are summed and provided to the vertical antenna elements 29V. The beamformed signals for the horizontal polarization of a first and second signal are summed and provided to the horizontal antenna elements 29H.

Here above, the beamformed communication has mainly been described as beamformed transmission of signals. This is thereby one possible embodiment of the methods.

Thus in one embodiment, the beamformed communication is a beamformed transmission of signals.

However, the beamformed communication may also be a beamformed reception of signals. The strategy is the same as for transmission. Reception of signals is scheduled and the receiving antennas are configured with phase shifts and amplitude modulations in order to enhance reception of signals from certain directions. By using tapered beamforming vectors in MU-MIMO reception cases, the received signals from the different UEs give typically rise to less interference compared to untapered beamforming vectors.

In another embodiment, the beamformed communication is a beamformed reception of signals.

Also, in the examples given here above, the methods are described as concerning transmission of downlink signals and reception of uplink signals. However, the same principles may also be possible to employ in the opposite directions. For instance in Fixed Wireless Access (FWA) or similar designs, the transmission according to the above described principles may be performed also in the uplink direction, and the reception according to the above described principles may be performed also in the downlink direction.

In one embodiment, the beamformed communication is a downlink communication.

In another embodiment, the beamformed communication is an uplink communication.

As used herein, the non-limiting terms "User Equipment (UE)", "station (STA)", terminal, and "wireless communication device" or "wireless device" may refer to a mobile phone, a cellular phone, a Personal Digital Assistant (PDA) equipped with radio communication capabilities, a smart phone, a laptop or Personal Computer (PC) equipped with an internal or external mobile broadband modem, a tablet PC with radio communication capabilities, a target device, a device to device UE, a machine type UE or UE capable of machine to machine communication, iPAD, Fixed Wireless Access Terminal (FWT), Customer Premises Equipment (CPE), Laptop Embedded Equipment (LEE), Laptop Mounted Equipment (LME), Universal Serial Bus (USB) dongle, a portable electronic radio communication device, a sensor device equipped with radio communication capabilities or the like. In particular, the term "UE", the term "Station", the term "wireless device" and the term "wireless communication device" should be interpreted as non-limiting terms comprising any type of wireless device communicating with a network node in a wireless communication system and/or possibly communicating directly with another wireless communication device. In other words, a wireless communication device may be any device equipped with circuitry for wireless communication according to any relevant standard for communication.

As used herein, the term "wired device" may refer to any device configured or prepared for wired connection to a network. In particular, the wired device may be at least some of the above devices, with or without radio communication capability, when configured for wired connection.

As used herein, the non-limiting term "network node" may refer to base stations, access points, network control nodes such as network controllers, radio network controllers, base station controllers, access controllers, and the like. In particular, the term "base station" may encompass different types of radio base stations including standardized base stations such as Node Bs (NB), or evolved Node Bs (eNB) and also macro/micro/pico radio base stations, home base stations, also known as femto base stations, relay nodes, repeaters, radio access points, Base Transceiver Stations (BTS), and even radio control nodes controlling one or more Remote Radio Units (RRU), or the like.

In the following, the general non-limiting term "communication unit" includes network nodes and/or associated wireless devices.

As used herein, the term "network device" may refer to any device located in connection with a communication network, including but not limited to devices in access networks, core networks and similar network structures. The term network device may also encompass cloud-based network devices.

It will be appreciated that the methods and devices described herein can be combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Alternatively, or as a complement, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

According to an aspect of the proposed technology there is provided a radio frequency unit configured to provide signals for beam-formed communication. The radio frequency unit is configured to retrieve, from a memory, first vector-associated data defined by an obtained first beam index. The first beam index is assigned to a first signal. The first signal is scheduled to be communicated by beamforming in a first direction. The memory has stored therein vector-associated data characterizing at least two sets of beamforming vectors for each polarization and for each one of a plurality of beam directions. The at least two sets of beamforming vectors for each polarization and for each one of a plurality of directions presenting different tapering and/or non-tapering. The first vector-associated data characterizes a first selected set of beamforming vectors that is designed to give a beam in the first direction. The first beam index comprises information for defining vector-associated data characterizing a particular one of the at least two sets of beamforming vectors for said first direction. The radio frequency unit is further configured to initiate a beamforming for the first signal by use of the vector-associated data characterizing the first selected set of beamforming vectors.

Figure 12:
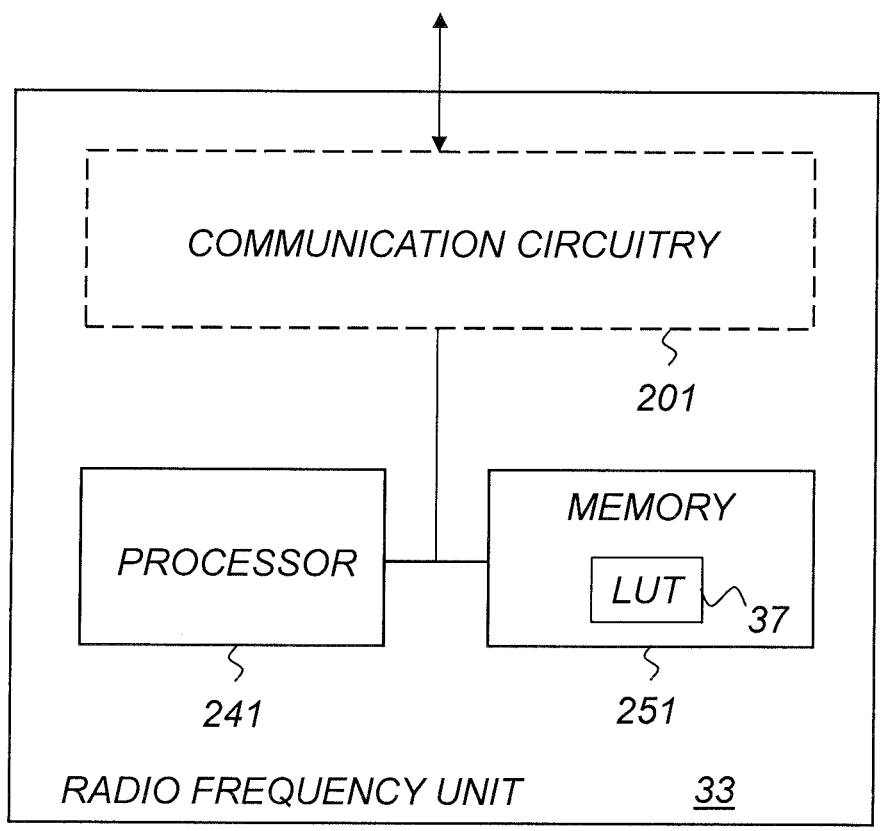
FIG. 12 is a schematic block diagram illustrating an embodiment of a radio frequency unit.

FIG. 12 is a schematic block diagram illustrating an example of a radio frequency unit 33, based on a processor-memory implementation according to an embodiment. In this particular example, the radio frequency unit 33 comprises a processor 241 and a memory 251, the memory 251 comprising instructions executable by the processor 241. The memory 251 also comprises the LUT 37. Thereby, the processor 241 is operative to retrieve the vector-associated data characterizing the first selected set of beamforming vectors from the LUT 37.

The radio frequency unit 33 also include a communication circuitry 201. The communication circuitry 201 may include functions for wired and/or wireless communication with other devices and/or network nodes in the network. In a particular example, the communication circuitry 201 may be based on radio circuitry for communication with one or more other nodes, including transmitting and/or receiving information. The communication circuit 201 may be interconnected to the processor 241 and/or memory 251. By way of example, the communication circuit 201 may include any of the following: a receiver, a transmitter, a transceiver, input/output (I/O) circuitry, input port(s) and/or output port(s).

In one embodiment, the radio frequency unit is further configured to retrieve, from the memory, second vector-associated data defined by an obtained second beam index. The second beam index is assigned to a second signal. The second signal is scheduled to be communicated by beamforming in the second direction. The second direction is different from the first direction. The second signal is scheduled to be communicated simultaneously as the first signal by a same antenna using a same physical resource. The second vector-associated data characterizing a second selected set of beamforming vectors, is designed to give a beam in the second direction. The second beam index comprises information for defining vector-associated data characterizing a particular one of the at least two sets of beamforming vectors for the second direction. The radio frequency unit is thereby further configured to perform the initiating of the beamforming by initiating a multi-user beamforming for the first and second signals by use of the first and second vector-associated data characterizing the first and second selected sets of beamforming vectors.

In one embodiment, the beam index has a part beam index defining a partition of the data characterizing the sets of beamforming vectors of the memory. This partition is associated with vector-associated data of only one set of beamforming vectors for each polarization and for each one of a plurality of directions.

In a further embodiment, the part beam index defines if the beamforming is a single-user beamforming or a multi-user beamforming. Preferably, a partition defined by a part beam index associated with a single-user beamforming comprises vector-associated data characterizing sets of beamforming vectors without tapering and a partition defined by a part beam index associated with a multi-user beamforming comprises vector-associated data characterizing sets of beamforming vectors with tapering.

In one embodiment, the vector-associated data characterizing sets of beamforming vectors comprises data defining phase shifts and intensity modulation for each antenna element.

In a further embodiment, the vector-associated data characterizing the at least two sets of beamforming vectors has a common set of phase shifts for each direction and separate data defining different intensity modulations for the at least two sets of beamforming vectors.

In one embodiment, the radio frequency unit is further configured to obtain the first beam index by receiving the first signal and the first beam index from a network node. In a further embodiment, the radio frequency unit is further configured to obtain the second beam index by receiving the second signal and the second beam index from a network node.

The selection of appropriate beamforming vectors are typically performed in connection with the general scheduling of the traffic. Thus, according to another aspect of the proposed technology there is provided a network node configured to schedule signals for beamformed communication. The network node is configured to select a first set of beamforming vectors among at least two first sets of beamforming vectors. The first set of beamforming vectors corresponds to a highest estimated total throughput for a first signal to be scheduled for beamformed communication in a first direction under intended prevailing radio conditions. The at least two first sets of beamforming vectors are designed to give a beam in the first direction for a given polarization. The at least two first sets of beamforming vectors presenting different tapering and/or non-tapering. The network node is further configured to initiate a transmission of a first beam index assigned to the first signal. The first beam index defines the first selected set of beamforming vectors.

Figure 13:
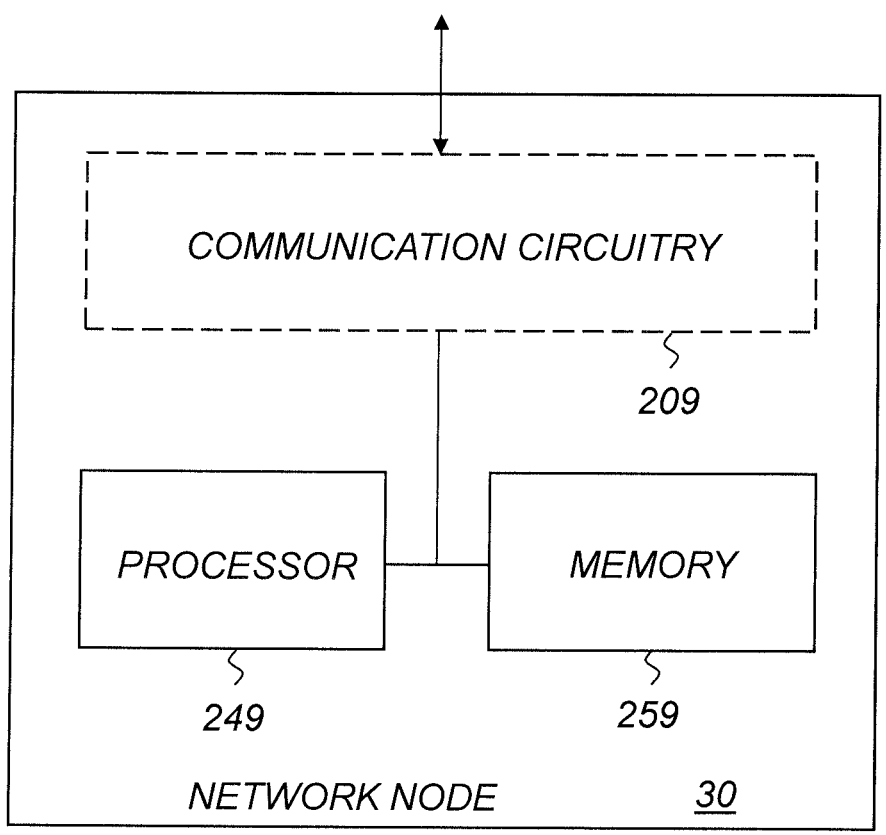
FIG. 13 is a schematic block diagram illustrating an embodiment of a network node.

FIG. 13 is a schematic block diagram illustrating an example of a network node 30, based on a processor-memory implementation according to an embodiment. In this particular example, network node 30 comprises a processor 249 and a memory 259, the memory 259 comprising instructions executable by the processor 249, whereby the processor 249 is operative to select the first set of beamforming vectors The network node 30 may also include a communication circuitry 209. The communication circuitry 209 may include functions for wired and/or wireless communication with other devices and/or network nodes in the network. In a particular example, the communication circuitry 209 may be based on radio circuitry or wired connections for communication with one or more other nodes, including transmitting and/or receiving information. The communication circuit 209 may be interconnected to the processor 249 and/or memory 259. By way of example, the communication circuit 209 may include any of the following: a receiver, a transmitter, a transceiver, input/output (I/O) circuitry, input port(s) and/or output port(s). The communication circuit 209 is operative to initiate said transmission of said first signal and said first beam index.

In one embodiment, the network node is further configured to select a second set of beamforming vectors among at least two second sets of beamforming vectors. The second set of beamforming vectors corresponding to a highest estimated total throughput for the first signal and for a second signal to be scheduled for beamformed communication in the first direction and a second direction, respectively, under intended prevailing radio conditions. The second direction is different from the first direction. The second signal is scheduled for beamformed communication simultaneously as the first signal by a same antenna using a same physical resource. The at least two second sets of beamforming vectors are designed to give a beam in the second direction for a given polarization. The at least two second sets of beamforming vectors present different tapering and/or non-tapering. The network node is further configured to initiate a transmission of a second beam index assigned to the second signal. The second beam index defines the second selected set of beamforming vectors.

In one embodiment, the beam index has a part beam index defining if the beamforming is a single-user beamforming or a multi-user beamforming. Preferably, the single-user beamforming is a beamforming using beamforming vectors without tapering and the multi-user beamforming is a beamforming using beamforming vectors with tapering.

In aspect of the presented technology, a wireless communication system comprises at least one radio frequency unit according to the description above and at least one network node according to the description above.

Figure 14:
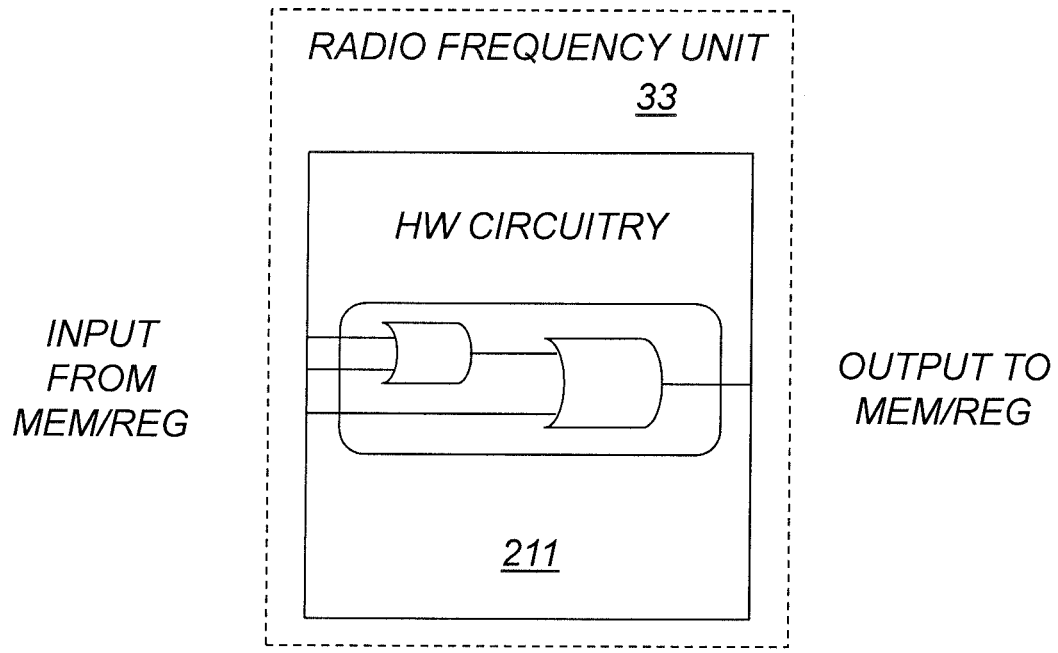
FIG. 14 is a schematic block diagram illustrating an embodiment of a radio frequency unit based on a hardware circuitry implementation.

FIG. 14 is a schematic block diagram illustrating another example of a radio frequency unit 33, based on a hardware circuitry implementation according to an embodiment. Particular examples of suitable hardware (HW) circuitry 211 include, besides the necessary Pas, one or more suitably configured or possibly reconfigurable electronic circuitry, e.g. Application Specific Integrated Circuits (ASICs), Field Programmable Gate Arrays (FPGAs), or any other hardware logic such as circuits based on discrete logic gates and/or flip-flops interconnected to perform specialized functions in connection with suitable registers (REG), and/or memory units (MEM).

Figure 15:
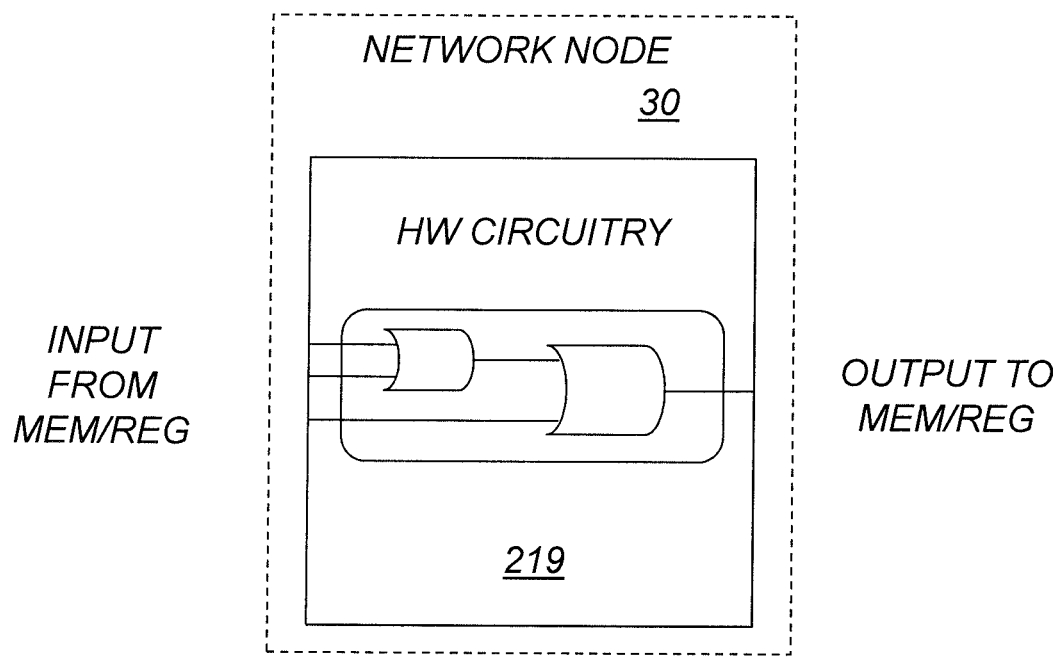
FIG. 15 is a schematic block diagram illustrating an embodiment of a network node based on a hardware circuitry implementation.

FIG. 15 is a schematic block diagram illustrating another example of a network node 30, based on a hardware circuitry implementation according to an embodiment. Particular examples of suitable hardware (HW) circuitry 219 include one or more suitably configured or possibly reconfigurable electronic circuitry, e.g. Application Specific Integrated Circuits (ASICs), Field Programmable Gate Arrays (FPGAs), or any other hardware logic such as circuits based on discrete logic gates and/or flip-flops interconnected to perform specialized functions in connection with suitable registers (REG), and/or memory units (MEM).

Figure 16:
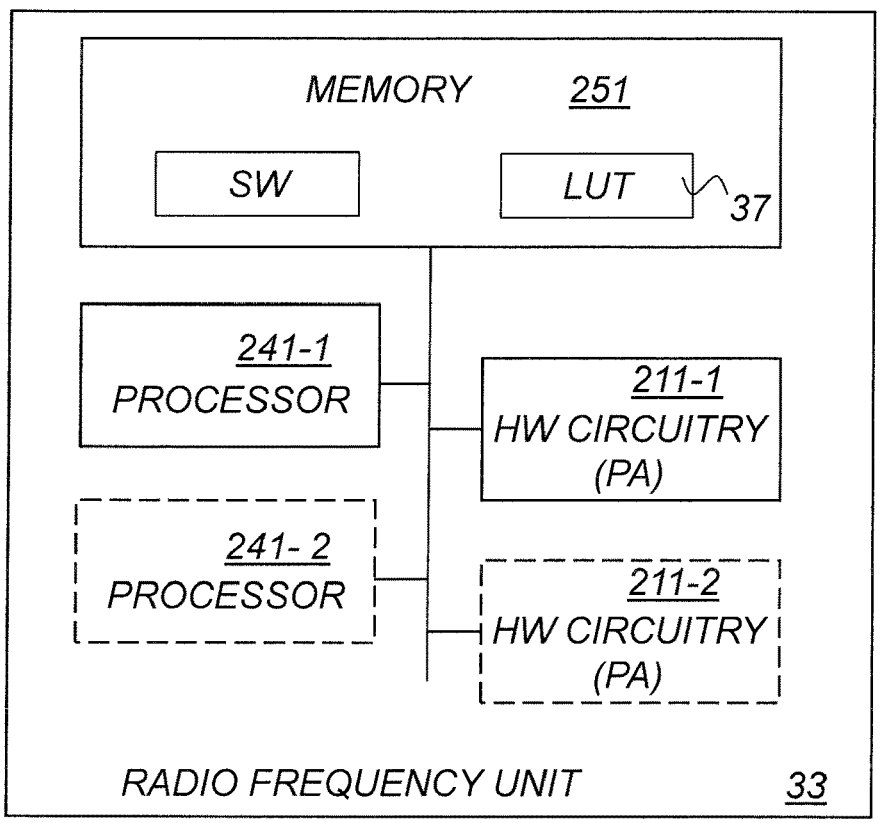
FIG. 16 is a schematic block diagram illustrating another embodiment of a radio frequency unit based on combination of both processor and hardware circuitry.

FIG. 16 is a schematic block diagram illustrating yet another example of a radio frequency unit 33, based on combination of both processor(s) 241-1, 241-2 and hardware circuitry 211-1, 211-2 in connection with suitable memory unit(s) 251. The radio frequency unit 33 comprises one or more processors 241-1, 241-2, memory 251 including storage for software and data, e.g. the LUT 37, and one or more units of hardware circuitry 211-1, 211-2 such as ASICs and/or FPGAs, besides necessary PAs. The overall functionality is thus partitioned between programmed software (SW) for execution on one or more processors 241-1, 241-2, and one or more pre-configured or possibly reconfigurable hardware circuits 211-1, 211-2 such as ASICs and/or FPGAs. The actual hardware-software partitioning can be decided by a system designer based on a number of factors including processing speed, cost of implementation and other requirements.

Figure 17:
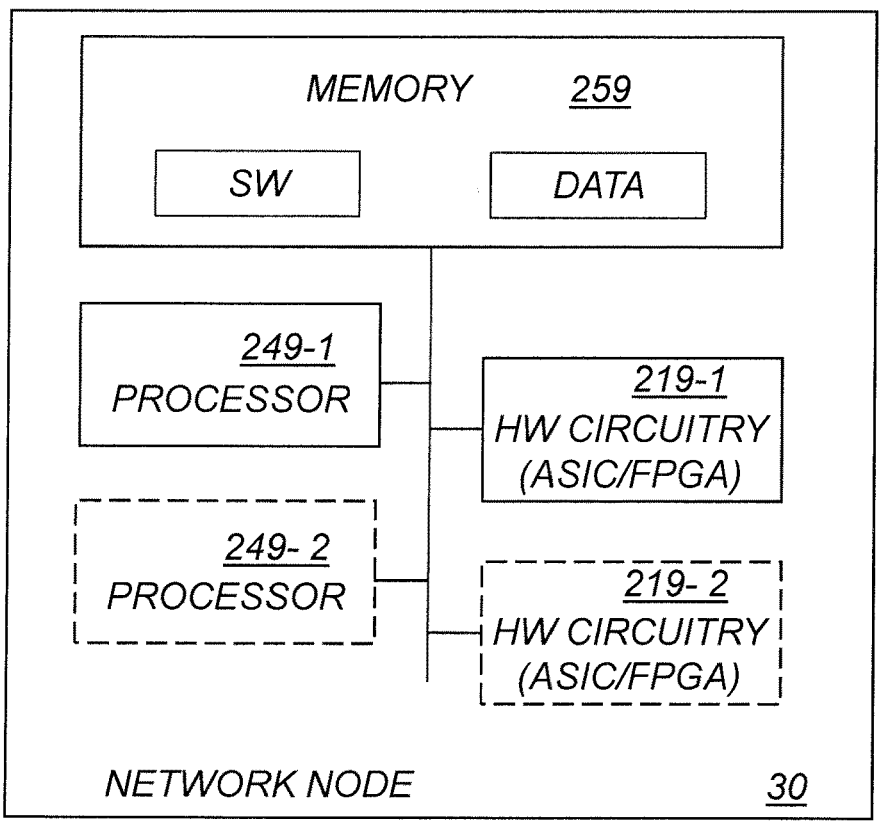
FIG. 17 is a schematic block diagram illustrating another embodiment of a network node based on combination of both processor and hardware circuitry.

FIG. 17 is a schematic block diagram illustrating yet another example of a network node 30, based on combination of both processor(s) 249-1, 249-2 and hardware circuitry 211-9, 219-2 in connection with suitable memory unit(s) 259. The network node 30 comprises one or more processors 249-1, 249-2, memory 259 including storage for software and data, and one or more units of hardware circuitry 219-1, 219-2 such as ASICs and/or FPGAs. The overall functionality is thus partitioned between programmed software (SW) for execution on one or more processors 249-1, 249-2, and one or more pre-configured or possibly reconfigurable hardware circuits 219-1, 219-2 such as ASICs and/or FPGAs. The actual hardware-software partitioning can be decided by a system designer based on a number of factors including processing speed, cost of implementation and other requirements.

Alternatively, or as a complement, at least some of the steps, functions, procedures, modules and/or blocks described herein may be implemented in software such as a computer program for execution by suitable processing circuitry such as one or more processors or processing units.

The flow diagram or diagrams presented herein may therefore be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

Figure 18:
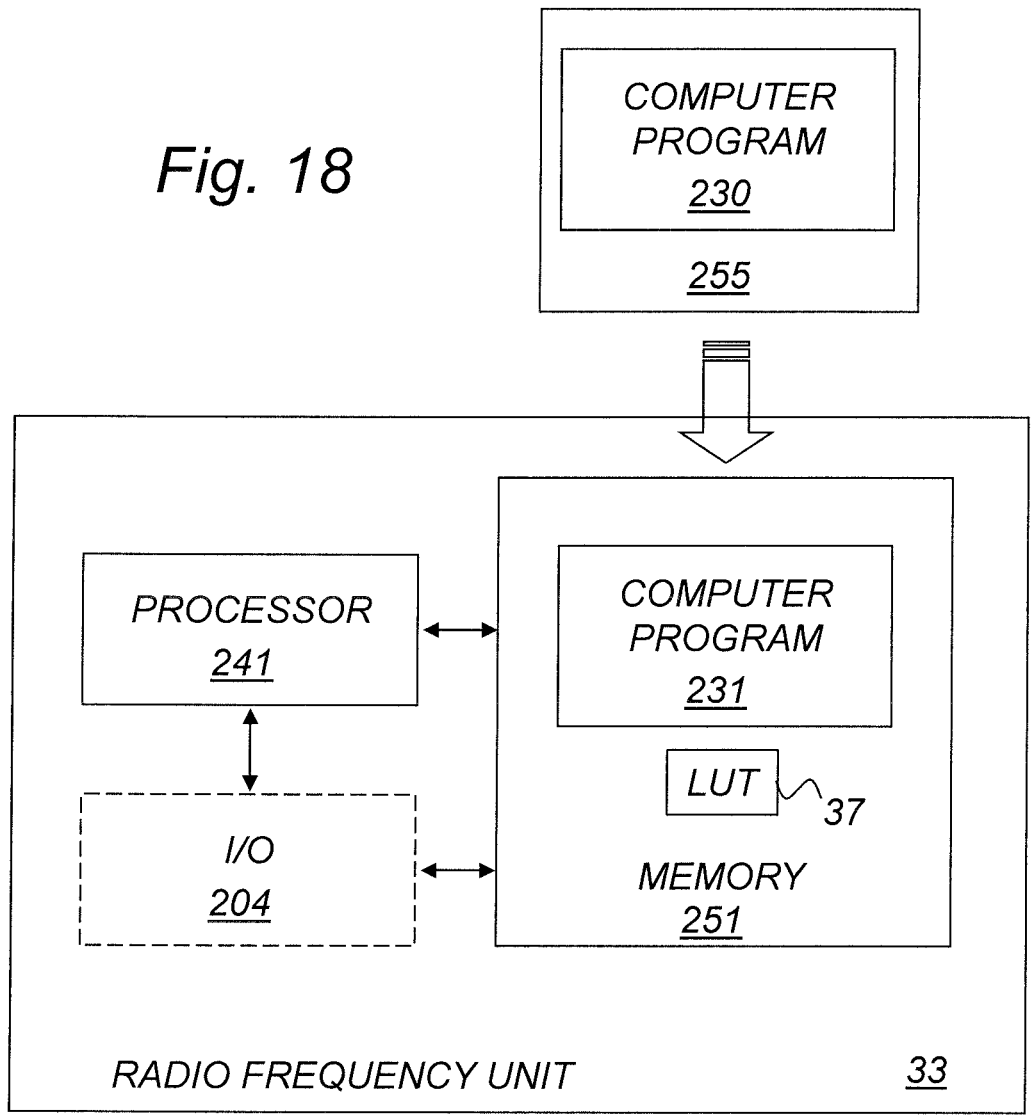
FIG. 18 is a schematic diagram illustrating an embodiment of a computer-implementation of a radio frequency unit.

FIG. 18 is a schematic diagram illustrating an embodiment of a computer-implementation of a radio frequency unit 33. In this particular embodiment, at least some of the steps, functions, procedures, modules and/or blocks described herein are implemented in a computer program 231, which is loaded into the memory 251 for execution by processing circuitry including one or more processors 241. The processor(s) 241 and memory 251 are interconnected to each other to enable normal software execution. An optional input/output device 204 may also be interconnected to the processor(s) 241 and/or the memory 251 to enable input and/or output of relevant data such as input parameter(s) and/or resulting output parameter(s).

In a particular embodiment, the computer program 231 comprises instructions, which when executed by at least one processor 241, cause the processor(s) 241 to retrieve, from a memory, first vector-associated defined by an obtained first beam index. The first beam index is assigned to a first signal. The first signal is scheduled to be communicated by beamforming in the first direction. The memory has stored therein vector-associated data characterizing at least two sets of beamforming vectors for each polarization and for each one of a plurality of beam directions. The at least two sets of beamforming vectors for each polarization and for each one of a plurality of directions presenting different tapering and/or non-tapering. The first vector-associated data characterizing a first selected set of beamforming vectors is designed to give a beam in a first direction. The first beam index comprises information for defining vector-associated data characterizing a particular one of the at least two sets of beamforming vectors for the first direction. The instructions, when executed by the processor(s), further cause the processor(s) to initiate a beamforming for the first signal by use of the first vector-associated data characterizing the first selected set of beamforming vectors.

Figure 19:
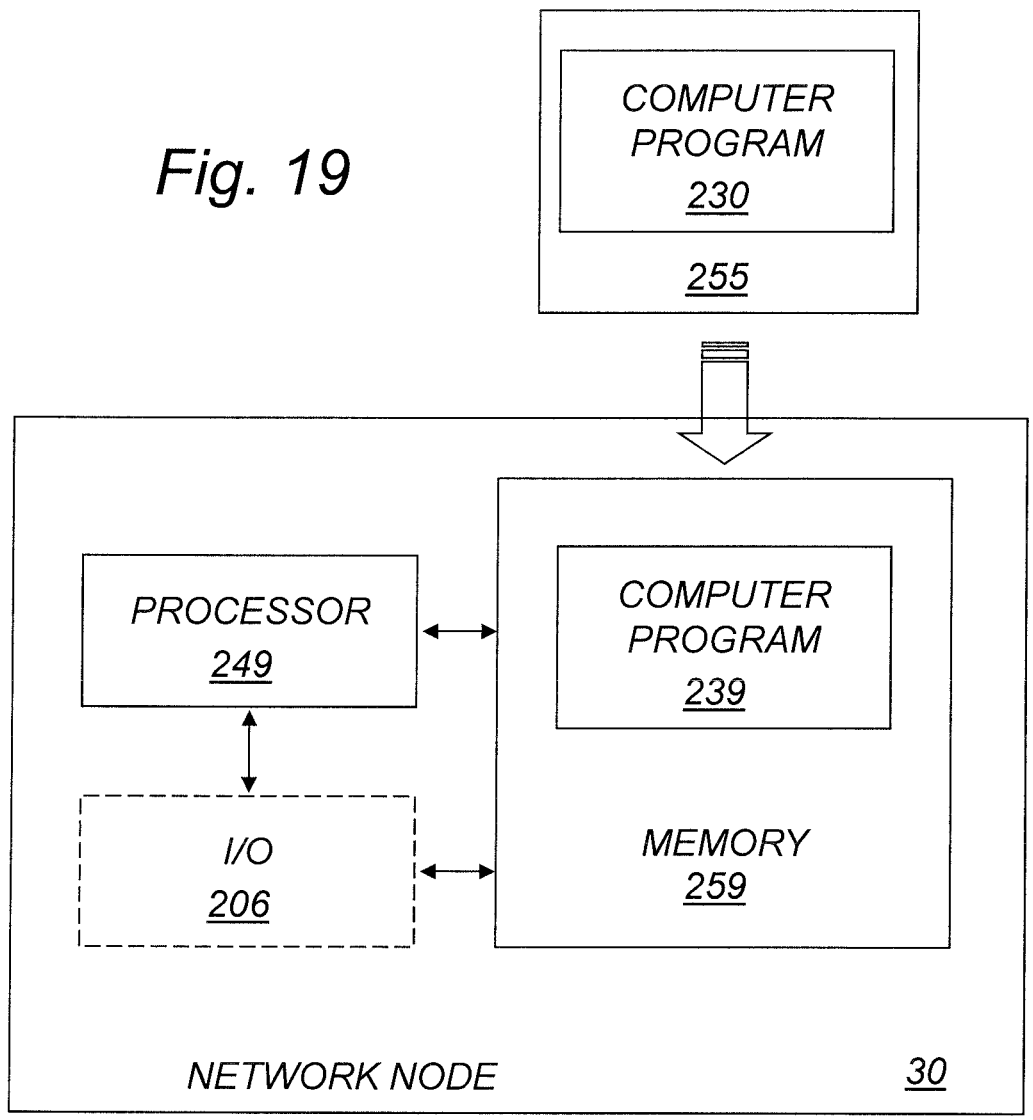
FIG. 19 is a schematic diagram illustrating an embodiment of a computer-implementation of a network node.

FIG. 19 is a schematic diagram illustrating an embodiment of a computer-implementation of a network node 30. In this particular embodiment, at least some of the steps, functions, procedures, modules and/or blocks described herein are implemented in a computer program 239, which is loaded into the memory 259 for execution by processing circuitry including one or more processors 249. The processor(s) 249 and memory 259 are interconnected to each other to enable normal software execution. An optional input/output device 206 may also be interconnected to the processor(s) 249 and/or the memory 259 to enable input and/or output of relevant data such as input parameter(s) and/or resulting output parameter(s).

In a particular embodiment, the computer program 239 comprises instructions, which when executed by at least one processor 249, cause the processor(s) 249 to select a first set of beamforming vectors among at least two first sets of beamforming vectors. The first set of beamforming vectors corresponding to a highest estimated total throughput for a first signal to be scheduled for beamformed communication in a first direction under intended prevailing radio conditions. The at least two first sets of beamforming vectors are designed to give a beam in the first direction for a given polarization. The at least two first sets of beamforming vectors presenting different tapering and/or non-tapering. The instructions, when executed by the processor(s), further cause the processor(s) to initiate a transmission of a first beam index assigned to the first signal. The first beam index defines the first selected set of beamforming vectors.

The term 'processor' should be interpreted in a general sense as any system or device capable of executing program code or computer program instructions to perform a particular processing, determining or computing task.

The processing circuitry including one or more processors 241, 249 is thus configured to perform, when executing the computer program 231, 239, well-defined processing tasks such as those described herein. The terms "processing circuitry" and "processor" will in the present disclosure be used as synonymous expressions.

The processing circuitry does not have to be dedicated to only execute the above-described steps, functions, procedure and/or blocks, but may also execute other tasks.

The proposed technology also provides a carrier comprising the computer program, wherein the carrier is one of an electronic signal, an optical signal, an electromagnetic signal, a magnetic signal, an electric signal, a radio signal, a microwave signal, or a computer-readable storage medium.

By way of example, the software or computer program 230; 231, 239 may be realized as a computer program product, which is normally carried or stored on a computer-readable medium 255; 251, 259, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program may thus be loaded into the operating memory of a computer or equivalent processing device for execution by the processing circuitry thereof.

Figure 20:
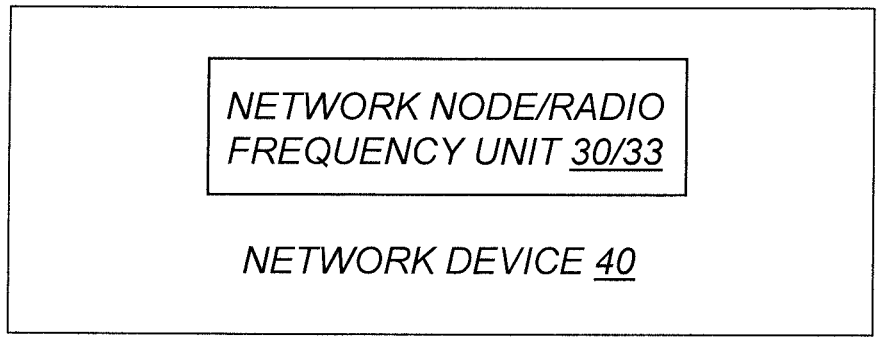
FIG. 20 is a schematic block diagram illustrating an embodiment of a network device.

FIG. 20 is a schematic block diagram illustrating an example of a network device (ND) 40 comprising a network node 30 and/or a RF unit 33 according to any of the embodiments.

According to an aspect, there is provided a network device 40 comprising a network node 30 and/or a RF unit 33 as described herein.

The network device may be any suitable network device in the wireless communication system, or a network device in connection with the wireless communication system. By way of example, the network device may be a suitable network node such a base station or an access point. However, the network device may alternatively be a cloud-implemented network device.

The flow diagram or diagrams presented herein may be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

The computer program residing in memory may thus be organized as appropriate function modules configured to perform, when executed by the processor, at least part of the steps and/or tasks described herein.

Figure 21:
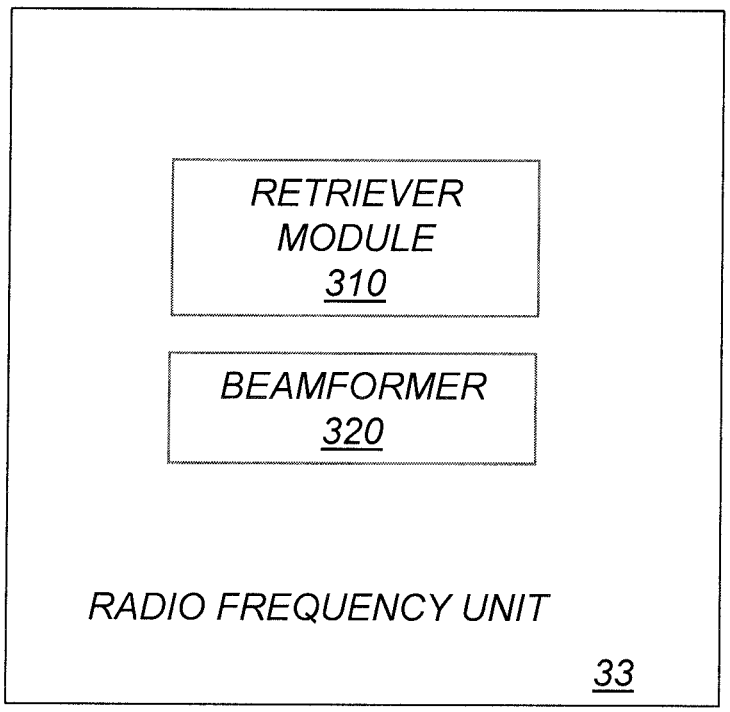
FIG. 21 is a schematic diagram illustrating an embodiment of a radio frequency unit.

FIG. 21 is a schematic diagram illustrating an example of a radio frequency unit 33 for providing signals for beamformed communication. The radio frequency unit 33 comprises a retriever module 310, for retrieving, from a memory, first vector-associated data defined by an obtained first beam index. The first beam index being assigned to a first signal. The first signal is scheduled to be communicated by beamforming in a first direction. The memory has stored therein vector-associated data characterizing at least two sets of beamforming vectors for each polarization and for each one of a plurality of beam directions. The at least two sets of beamforming vectors for each polarization and for each one of a plurality of directions presenting different tapering and/or non-tapering. The first vector-associated data characterizing a first selected set of beamforming vectors is designed to give a beam in the first direction. The first beam index comprises information for defining vector-associated data characterizing a particular one of the at least two sets of beamforming vectors for the first direction. The radio frequency unit 33 further comprises a beamformer 320 for initiating a beamforming for the first signal by use of the first vector-associated data characterizing the first selected set of beamforming vectors.

Figure 22:
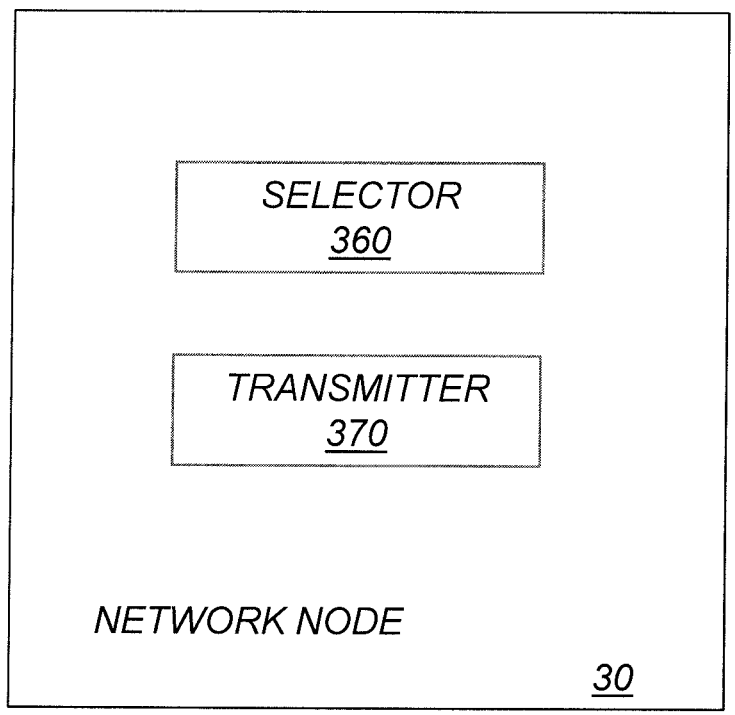
FIG. 22 is a schematic diagram illustrating an embodiment of a network node.

FIG. 22 is a schematic diagram illustrating an example of a network node 30 for scheduling signals for beam-formed communication. The network node 30 comprises a selector 360, for selecting a first set of beamforming vectors among at least two first sets of beamforming vectors. The first set of beamforming vectors corresponding to a highest estimated total throughput for a first signal to be scheduled for beam-formed communication in a first direction under intended prevailing radio conditions. The at least two first sets of beamforming vectors are designed to give a beam in the first direction for a given polarization. The at least two first sets of beamforming vectors present different tapering and/or non-tapering. The network node 30 further comprises a transmitter 370, for initiating a transmission of a first beam index assigned to the first signal. The first beam index defines the first selected set of beamforming vectors.

Alternatively it is possible to realize the module(s) in FIGS. 21 and 22 predominantly by hardware modules, or alternatively by hardware, with suitable interconnections between relevant modules. Particular examples include one or more suitably configured digital signal processors and other known electronic circuits, e.g. discrete logic gates interconnected to perform a specialized function, and/or Application Specific Integrated Circuits (ASICs) as previously mentioned. Other examples of usable hardware include input/output (I/O) circuitry and/or circuitry for receiving and/or sending signals. The extent of software versus hardware is purely implementation selection.

As indicated for the methods, also the devices for the beamformed communication here above has mainly been described as beamformed transmission of signals. This is thereby one possible embodiment of the methods.

Thus in one embodiment, the beamformed communication is a beamformed transmission of signals.

However, the beamformed communication may also be a beamformed reception of signals. The strategy is the same as for transmission. Reception of signals is scheduled and the receiving antennas are configured with phase shifts and amplitude modulations in order to receive signals from certain directions. By using tapered beamforming vectors in MU-MIMO reception cases, the received signals from the different UEs give typically rise to less interference compared to untapered beamforming vectors.

In another embodiment, the beamformed communication is a beamformed reception of signals.

Also, in the examples given here above, the radio frequency unit and the network node are described as being comprised in a radio access network or a core network. However, the same principles may also be possible to employ in the opposite end of the communication. For instance in Fixed Wireless Access (FWA) or similar designs, the radio frequency unit and the network node according to the above described embodiments may be located in a user equipment or user equipment network.

In one embodiment, the radio frequency unit is comprised in a user equipment.

In another embodiment, the radio frequency unit is comprised in a base station.

In one embodiment, the network node is comprised in a user equipment or a user equipment network.

In another embodiment, the network node is comprised in a base station or a device connected thereto.

It is becoming increasingly popular to provide computing services (hardware and/or software) in network devices such as network nodes and/or servers where the resources are delivered as a service to remote locations over a network. By way of example, this means that functionality, as described herein, can be distributed or re-located to one or more separate physical nodes or servers. The functionality may be re-located or distributed to one or more jointly acting physical and/or virtual machines that can be positioned in separate physical node(s), i.e. in the so-called cloud. This is sometimes also referred to as cloud computing, which is a model for enabling ubiquitous on-demand network access to a pool of configurable computing resources such as networks, servers, storage, applications and general or customized services.

There are different forms of virtualization that can be useful in this context, including one or more of:

Consolidation of network functionality into virtualized software running on customized or generic hardware. This is sometimes referred to as network function virtualization.

Co-location of one or more application stacks, including operating system, running on separate hardware onto a single hardware platform. This is sometimes referred to as system virtualization, or platform virtualization.

Co-location of hardware and/or software resources with the objective of using some advanced domain level scheduling and coordination technique to gain increased system resource utilization. This is sometimes referred to as resource virtualization, or centralized and coordinated resource pooling.

Although it may often desirable to centralize functionality in so-called generic data centers, in other scenarios it may in fact be beneficial to distribute functionality over different parts of the network.

Figure 23:
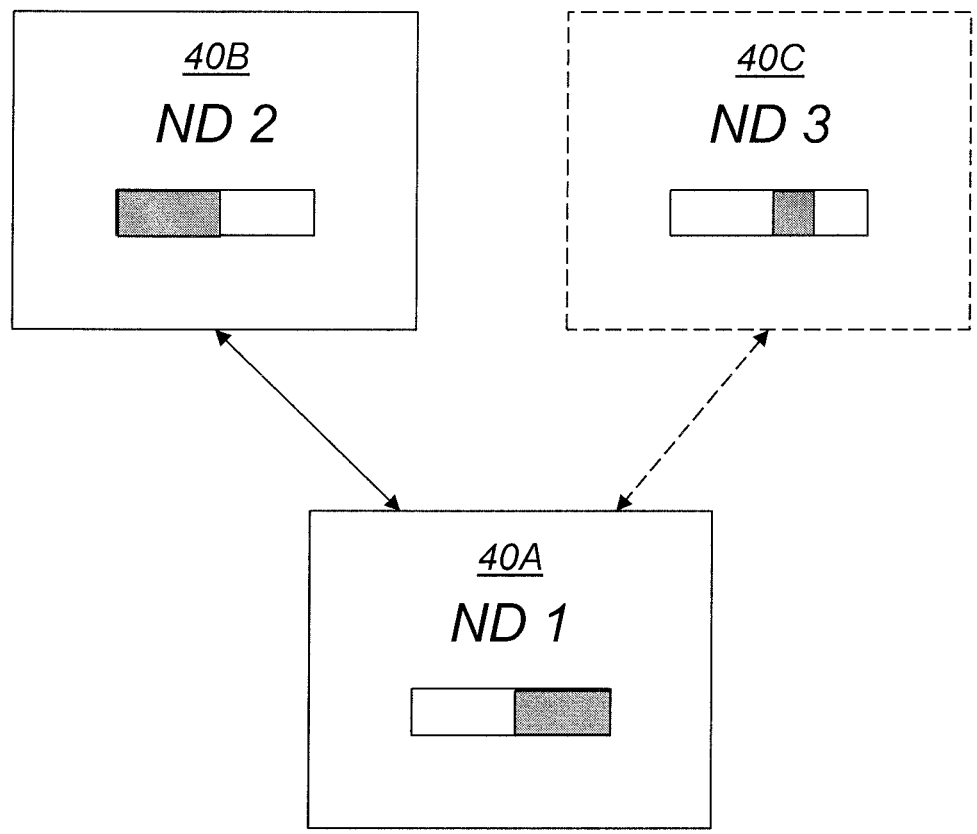
FIG. 23 is a schematic diagram illustrating a general example of functionality distribution or partition.

FIG. 23 is a schematic diagram illustrating an example of how functionality can be distributed or partitioned between different Network Devices (ND) in a general case. In this example, there are at least two individual, but interconnected network devices, ND 1 and ND 2, with reference numerals 40A and 40B, respectively, which may have different functionalities, or parts of the same functionality, partitioned between the network devices 40A and 40B. There may be additional network devices, such as ND 3, with reference numeral 40C, being part of such a distributed implementation. The network devices 40A-C may be part of the same wireless communication system, or one or more of the network devices may be so-called cloud-based network devices located outside of the wireless communication system.

Figure 24:
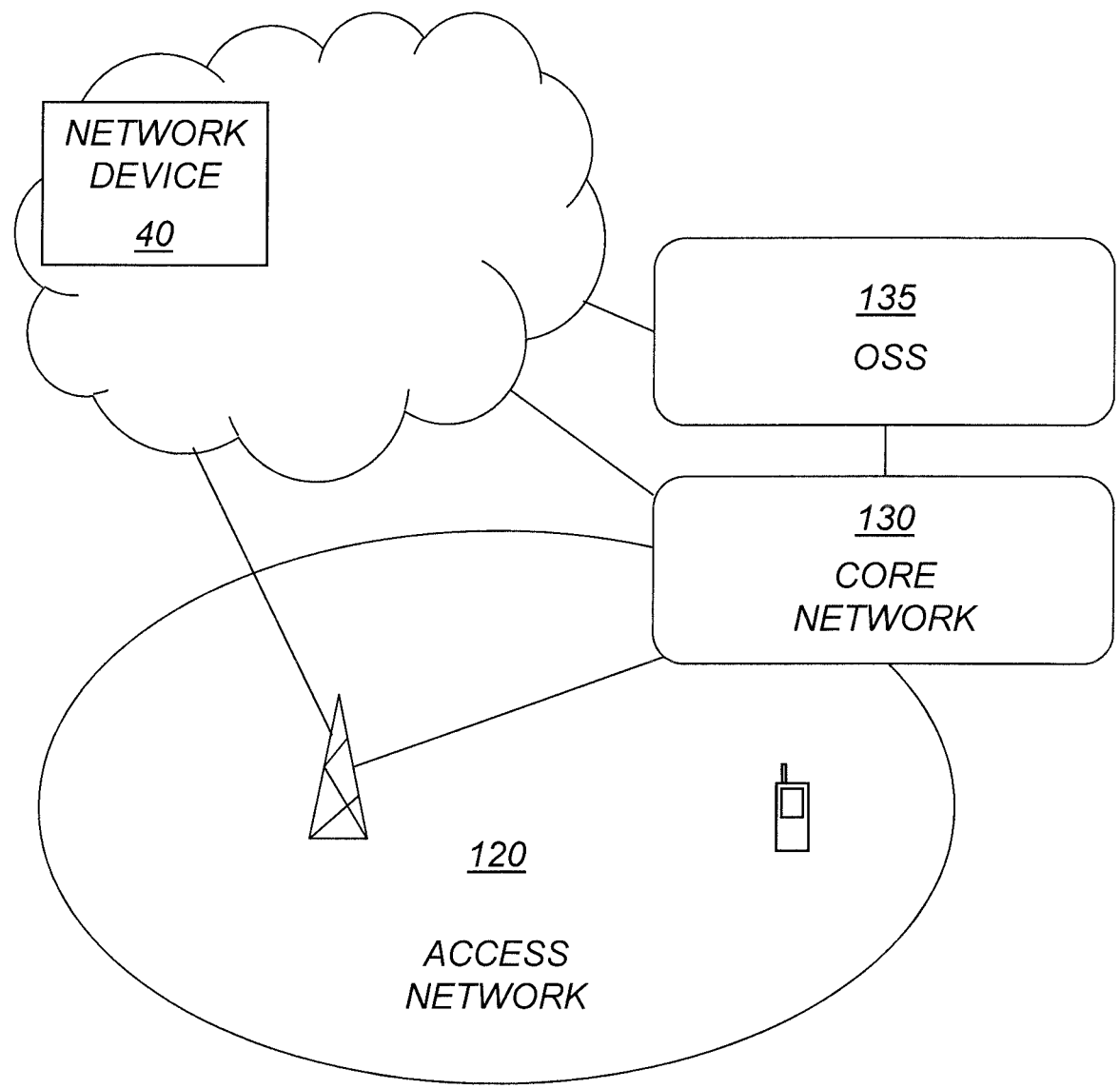
FIG. 24 is a schematic diagram illustrating an example of a wireless communication system in cooperation with one or more cloud-based network devices.

FIG. 24 is a schematic diagram illustrating an example of a wireless communication system, including an access network 120 and/or a core network 130 and/or an Operations and Support System (OSS), 135 in cooperation with one or more cloud-based network devices 40. Functionality relevant for the access network 120 and/or the core network 130 and/or the OSS system 135 may be at least partially implemented for execution in a cloud-based network device 40, with suitable transfer of information between the cloud-based network device and the relevant network nodes and/or communication units in the access network and/or the core network and/or the OSS system.

A Network Device (ND) may generally be seen as an electronic device being communicatively connected to other electronic devices in the network.

By way of example, the network device may be implemented in hardware, software or a combination thereof. For example, the network device may be a special-purpose network device or a general purpose network device, or a hybrid thereof.

A special-purpose network device may use custom processing circuits and a proprietary operating system (OS), for execution of software to provide one or more of the features or functions disclosed herein.

A general purpose network device may use Common Off-The-Shelf (COTS) processors and a standard OS, for execution of software configured to provide one or more of the features or functions disclosed herein.

By way of example, a special-purpose network device may include hardware comprising processing or computing resource(s), which typically include a set of one or more processors, and physical network interfaces (NIs), which sometimes are called physical ports, as well as non-transitory machine readable storage media having stored thereon software. A physical NI may be seen as hardware in a network device through which a network connection is made, e.g. wirelessly through a Wireless Network Interface Controller (WNIC) or through plugging in a cable to a physical port connected to a Network Interface Controller (NIC). During operation, the software may be executed by the hardware to instantiate a set of one or more software instance(s). Each of the software instance(s), and that part of the hardware that executes that software instance, may form a separate virtual network element.

By way of another example, a general purpose network device may for example include hardware comprising a set of one or more processor(s), often COTS processors, and network interface controller(s) (NICs), as well as non-transitory machine readable storage media having stored thereon software. During operation, the processor(s) executes the software to instantiate one or more sets of one or more applications. While one embodiment does not implement virtualization, alternative embodiments may use different forms of virtualization—for example represented by a virtualization layer and software containers. For example, one such alternative embodiment implements operating system-level virtualization, in which case the virtualization layer represents the kernel of an operating system (or a shim executing on a base operating system) that allows for the creation of multiple software containers that may each be used to execute one of a sets of applications. In an example embodiment, each of the software containers (also called virtualization engines, virtual private servers, or jails) is a user space instance (typically a virtual memory space). These user space instances may be separate from each other and separate from the kernel space in which the operating system is executed; the set of applications running in a given user space, unless explicitly allowed, cannot access the memory of the other processes. Another such alternative embodiment implements full virtualization, in which case: 1) the virtualization layer represents a hypervisor (sometimes referred to as a Virtual Machine Monitor (VMM)) or the hypervisor is executed on top of a host operating system; and 2) the software containers each represent a tightly isolated form of software container called a virtual machine that is executed by the hypervisor and may include a guest operating system.

A hypervisor is the software/hardware that is responsible for creating and managing the various virtualized instances and in some cases the actual physical hardware. The hypervisor manages the underlying resources and presents them as virtualized instances. What the hypervisor virtualizes to appear as a single processor may actually comprise multiple separate processors. From the perspective of the operating system, the virtualized instances appear to be actual hardware components.

A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes.

The instantiation of the one or more sets of one or more applications as well as the virtualization layer and software containers if implemented, are collectively referred to as software instance(s). Each set of applications, corresponding software container if implemented, and that part of the hardware that executes them (be it hardware dedicated to that execution and/or time slices of hardware temporally shared by software containers), forms a separate virtual network element(s).

The virtual network element(s) may perform similar functionality compared to Virtual Network Element(s) (VNEs). This virtualization of the hardware is sometimes referred to as Network Function Virtualization (NFV). Thus, NFV may be used to consolidate many network equipment types onto industry standard high volume server hardware, physical switches, and physical storage, which could be located in data centers, NDs, and Customer Premise Equipment (CPE). However, different embodiments may implement one or more of the software container(s) differently. For example, while embodiments are illustrated with each software container corresponding to a VNE, alternative embodiments may implement this correspondence or mapping between software container-VNE at a finer granularity level; it should be understood that the techniques described herein with reference to a correspondence of software containers to VNEs also apply to embodiments where such a finer level of granularity is used.

According to yet another embodiment, there is provided a hybrid network device, which includes both custom processing circuitry/proprietary OS and COTS processors/standard OS in a network device, e.g. in a card or circuit board within a ND. In certain embodiments of such a hybrid network device, a platform Virtual Machine (VM), such as a VM that implements functionality of a special-purpose network device, could provide for para-virtualization to the hardware present in the hybrid network device.

Figure 25:
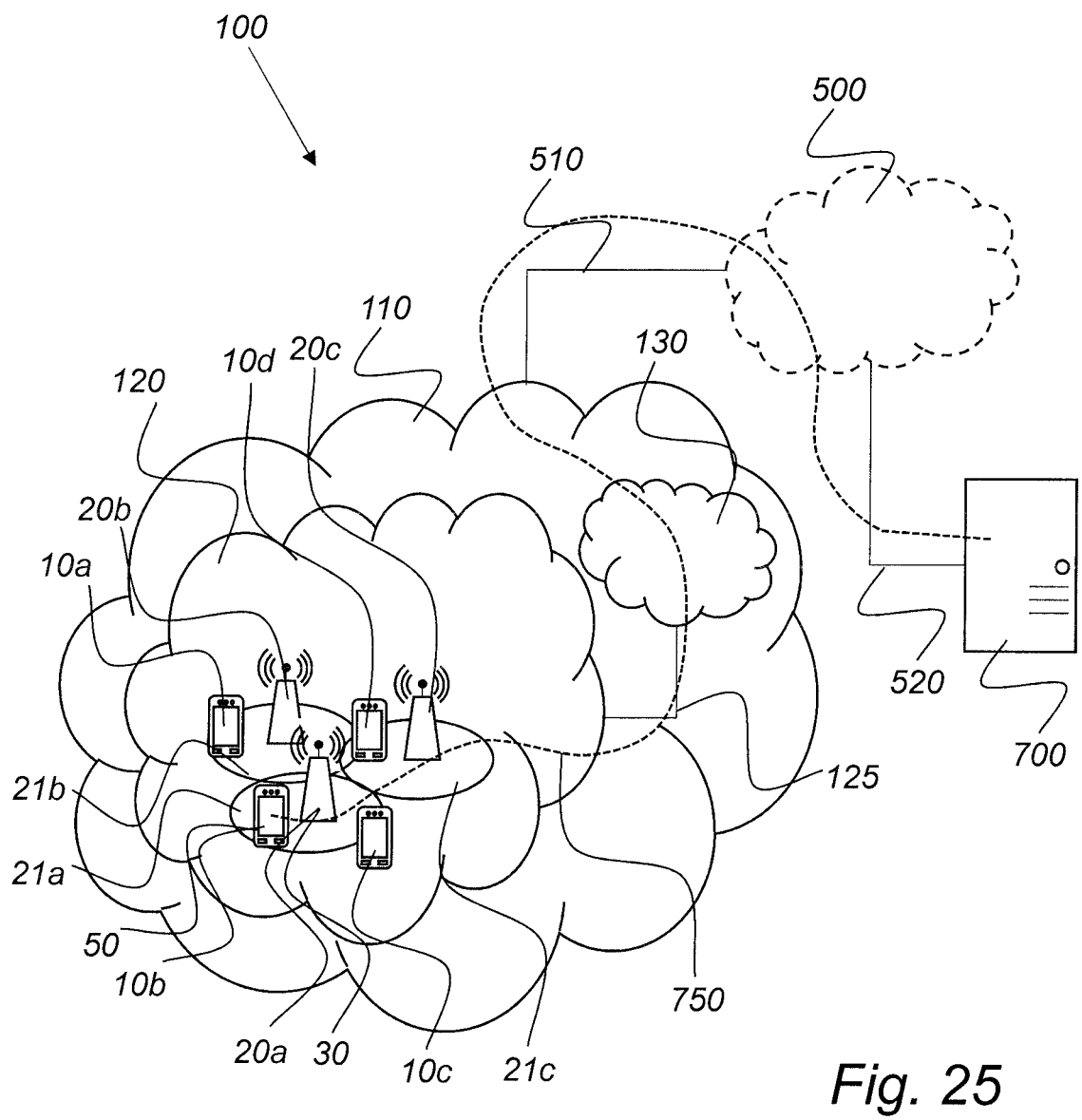
FIG. 25 schematically illustrates a telecommunication network connected via an intermediate network to a host computer.

With reference to FIG. 25, in accordance with an embodiment, a communication system 100 includes a telecommunication network 110, such as a 3GPP-type cellular network, which comprises an access network 120, such as a Radio Access Network (RAN), and a Core Network (CN) 130. The access network 120 comprises a plurality of base stations 20a, 20b, 20c, such as Node Bs (NB), evolved Node Bs (eNB), New Radio Node Bs (gNB) or other types of wireless access points, each defining a corresponding coverage area 21a, 21b, 21c. Each base station 20a, 20b, 20c is connectable to the CN 130 over a wired or wireless connection 125. A first user equipment (UE) 10a located in coverage area 21c is configured to wirelessly connect to, or be paged by, the corresponding base station 20c. A second UE 10b in coverage area 21a is wirelessly connectable to the corresponding base station 20a. While a plurality of UEs 10a-d are illustrated in this example, the disclosed embodiments are equally applicable to a situation where a sole UE is in the coverage area or where a sole UE is connecting to the corresponding base station 20.

The base station 20 is one type of a network node 30. Many operations that in a typical applications are performed in a base station 20 may alternatively be performed in another network node 30 or even in a node external to the telecommunication network 110. The devices and methods described here below as being performed in a base station 20 should be interpreted as also being possible to perform in a general network node 30.

The UE 10 is one type of a wireless device 11. Many operations that in a typical applications are performed in a UE 10 may alternatively be performed in any other wireless device 11. The devices and methods described here below as being performed in a UE 10 should be interpreted as also being possible to perform in a general wireless device 11.

The telecommunication network 110 is itself connected to a host computer 700, which may be embodied in the hardware and/or software of a standalone server, a cloud implemented server, a distributed server or as processing resources in a server farm. The host computer 700 may be under the ownership or control of a service provider, or may be operated by the service provider or on behalf of the service provider. The connections 510, 520 between the telecommunication network 110 and the host computer 700 may extend directly from the CN 130 to the host computer 700 or may go via an optional intermediate network 500. The intermediate network 500 may be one of, or a combination of more than one of, a public, private or hosted network; the intermediate network 500, if any, may be a backbone network or the Internet; in particular, the intermediate network 500 may comprise two or more sub-networks (not shown).

The communication system of FIG. 25 as a whole enables connectivity between one of the connected UEs 10*a*-*d* and the host computer 700. The connectivity may be described as an over-the-top (OTT) connection 750. The host computer 700 and the connected UEs 10*a*-*d* are configured to communicate data and/or signalling via the OTT connection 750, using the access network 120, the CN 130, any intermediate network 500 and possible further infrastructure (not shown) as intermediaries. The OTT connection 750 may be transparent in the sense that the participating communication devices through which the OTT connection 750 passes are unaware of routing of uplink and downlink communications. For example, a base station 20 may not or need not be informed about the past routing of an incoming downlink communication with data originating from a host computer 700 to be forwarded (e.g., handed over) to a connected UE 10. Similarly, the base station 20 need not be aware of the future routing of an outgoing uplink communication originating from the UE 10 towards the host computer 700.

Example implementations, in accordance with an embodiment, of the UE, base station and host computer discussed in the preceding paragraphs will now be described with reference to FIG. 26. In a communication system 100, a host computer 700 comprises hardware 710 including a communication interface 730 configured to set up and maintain a wired or wireless connection with an interface of a different communication device of the communication system 100. The host computer 700 further comprises processing circuitry 740, which may have storage and/or processing capabilities. In particular, the processing circuitry 740 may comprise one or more programmable processors, application-specific integrated circuits, field programmable gate arrays or combinations of these (not shown) adapted to execute instructions. The host computer 700 further comprises software 720, which is stored in or accessible by the host computer 700 and executable by the processing circuitry 740. The software 720 includes a host application 722. The host application 722 may be operable to provide a service to a remote user, such as a UE 10 connecting via an OTT connection 750 terminating at the UE 10 and the host computer 700. In providing the service to the remote user, the host application 722 may provide user data which is transmitted using the OTT connection 750.

The communication system 100 further includes a base station 20 provided in a telecommunication system and comprising hardware 155 enabling it to communicate with the host computer 700 and with the UE 10. The hardware 155 may include a communication interface 150 for setting up and maintaining a wired or wireless connection with an interface of a different communication device of the communication system 100, as well as a radio interface 160 for setting up and maintaining at least a wireless connection 165 with a UE 10 located in a coverage area (not shown in FIG. 26) served by the base station 20. The communication interface 150 may be configured to facilitate a connection 151 to the host computer 700. The connection 151 may be direct or it may pass through a CN (not shown in FIG. 26) of the telecommunication system and/or through one or more intermediate networks outside the telecommunication system. In the embodiment shown, the hardware 155 of the base station 20 further includes processing circuitry 170, which may comprise one or more programmable processors, application-specific integrated circuits, field programmable gate arrays or combinations of these (not shown) adapted to execute instructions. The base station 20 further has software 156 stored internally or accessible via an external connection.

The communication system 100 further includes the UE 10 already referred to. Its hardware 185 may include a radio interface 180 configured to set up and maintain a wireless connection 165 with a base station serving a coverage area in which the UE 10 is currently located. The hardware 185 of the UE 10 further includes processing circuitry 190, which may comprise one or more programmable processors, application-specific integrated circuits, field programmable gate arrays or combinations of these (not shown) adapted to execute instructions. The UE 10 further comprises software 186, which is stored in or accessible by the UE 10 and executable by the processing circuitry 190. The software 186 includes a client application 192. The client application 192 may be operable to provide a service to a human or non-human user via the UE 10, with the support of the host computer 700. In the host computer 700, an executing host application 722 may communicate with the executing client application 192 via the OTT connection 750 terminating at the UE 10 and the host computer 700. In providing the service to the user, the client application 192 may receive request data from the host application 722 and provide user data in response to the request data. The OTT connection 750 may transfer both the request data and the user data. The client application 192 may interact with the user to generate the user data that it provides.

Figure 26:
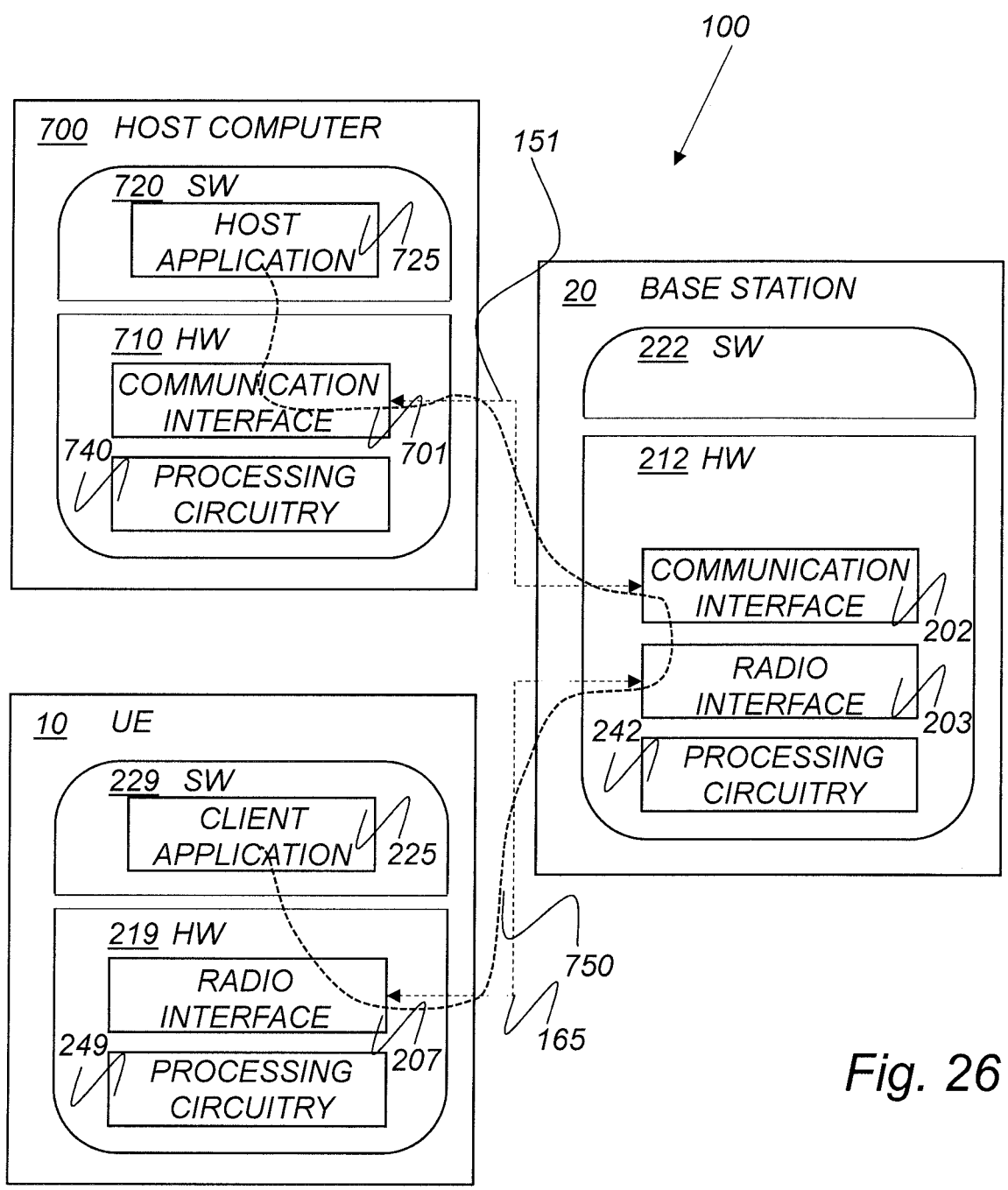
FIG. 26 is a generalized block diagram of a host computer communicating via a base station with a user equipment over a partially wireless connection.

It is noted that the host computer 700, base station 20 and UE 10 illustrated in FIG. 26 may be identical to the host computer 700, one of the base stations 20*a*, 20*b*, 20*c* and one of the UEs 10*a*-*d* of FIG. 25, respectively. This is to say, the inner workings of these entities may be as shown in FIG. 26 and independently, the surrounding network topology may be that of FIG. 25.

In FIG. 26, the OTT connection 750 has been drawn abstractly to illustrate the communication between the host computer 700 and the use equipment 10 via the base station 20, without explicit reference to any intermediary devices and the precise routing of messages via these devices. Network infrastructure may determine the routing, which it may be configured to hide from the UE 10 or from the service provider operating the host computer 700, or both. While the OTT connection 750 is active, the network infrastructure may further take decisions by which it dynamically changes the routing (e.g., on the basis of load balancing consideration or reconfiguration of the network).

The wireless connection 165 between the UE 10 and the base station 20 is in accordance with the teachings of the embodiments described throughout this disclosure. One or more of the various embodiments improve the performance of OTT services provided to the UE 10 using the OTT connection 700, in which the wireless connection 165 forms the last segment. More precisely, the teachings of these embodiments may improve the throughput and thereby provide benefits such as reduced user waiting time.

A measurement procedure may be provided for the purpose of monitoring data rate, latency and other factors on which the one or more embodiments improve. There may further be an optional network functionality for reconfiguring the OTT connection 750 between the host computer 700 and UE 10, in response to variations in the measurement results. The measurement procedure and/or the network functionality for reconfiguring the OTT connection 750 may be implemented in the software 720 of the host computer 700 or in the software 186 of the UE 10, or both. In embodiments, sensors (not shown) may be deployed in or in association with communication devices through which the OTT connection 750 passes; the sensors may participate in the measurement procedure by supplying values of the monitored quantities exemplified above, or supplying values of other physical quantities from which software 720, 186 may compute or estimate the monitored quantities. The reconfiguring of the OTT connection 750 may include message format, retransmission settings, preferred routing etc.; the reconfiguring need not affect the base station 20, and it may be unknown or imperceptible to the base station 20. Such procedures and functionalities may be known and practiced in the art. In certain embodiments, measurements may involve proprietary UE signalling facilitating the host computer's 700 measurements of throughput, propagation times, latency and the like. The measurements may be implemented in that the software 720 causes messages to be transmitted, in particular empty or 'dummy' messages, using the OTT connection 750 while it monitors propagation times, errors etc.

Figure 27:
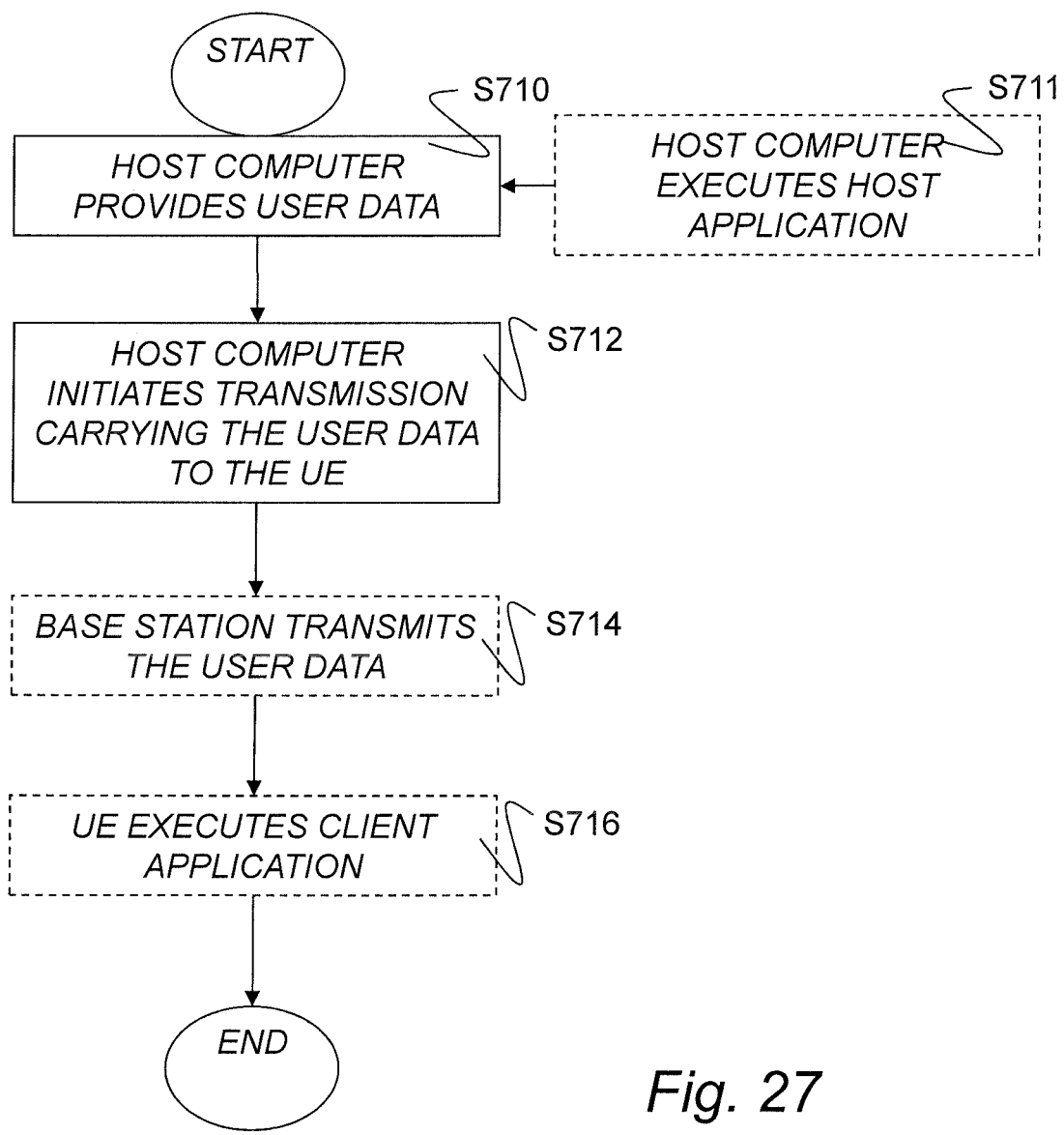
FIGS. 27-30 are flowcharts illustrating methods implemented in a communication system including a host computer, a base station and a user equipment.

FIG. 27 is a flowchart illustrating a method implemented in a communication system, in accordance with one embodiment. The communication system includes a host computer, a base station and a UE which may be those described with reference to FIGS. 25 and 26. For simplicity of the present disclosure, only drawing references to FIG. 27 will be included in this section. In a first step S710 of the method, the host computer provides user data. In an optional substep S711 of the first step S710, the host computer provides the user data by executing a host application. In a second step S712, the host computer initiates a transmission carrying the user data to the UE. In an optional third step S714, the base station transmits to the UE the user data which was carried in the transmission that the host computer initiated, in accordance with the teachings of the embodiments described throughout this disclosure. In an optional fourth step S716, the UE executes a client application associated with the host application executed by the host computer.

Figure 28:
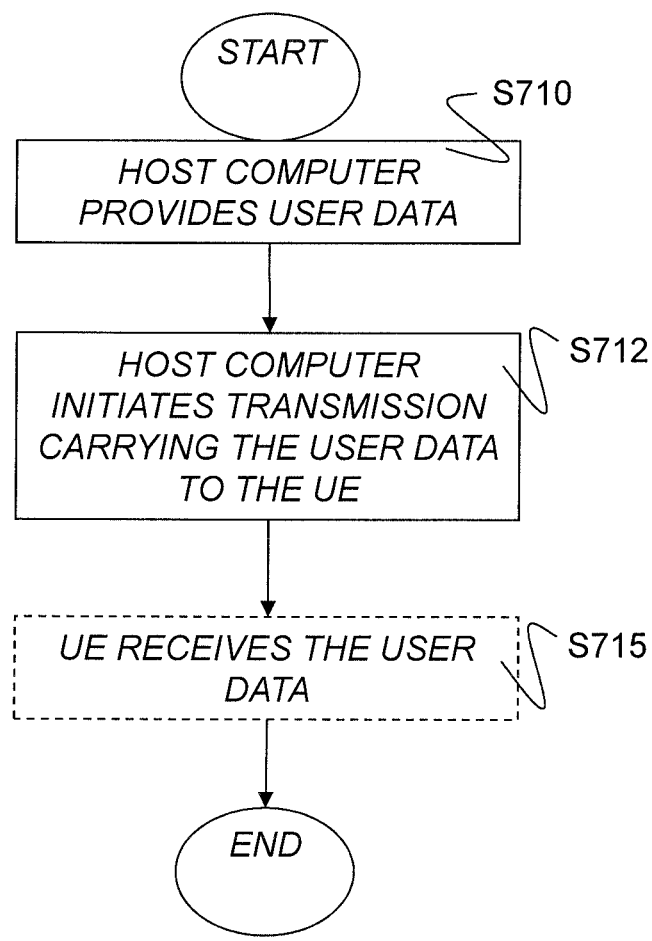

FIG. 28 is a flowchart illustrating a method implemented in a communication system, in accordance with one embodiment. The communication system includes a host computer, a base station and a UE which may be those described with reference to FIGS. 25 and 26. For simplicity of the present disclosure, only drawing references to FIG. 28 will be included in this section. In a first step S710 of the method, the host computer provides user data. In an optional substep (not shown) the host computer provides the user data by executing a host application. In a second step S712, the host computer initiates a transmission carrying the user data to the UE. The transmission may pass via the base station, in accordance with the teachings of the embodiments described throughout this disclosure. In an optional third step S715, the UE receives the user data carried in the transmission.

Figure 29:
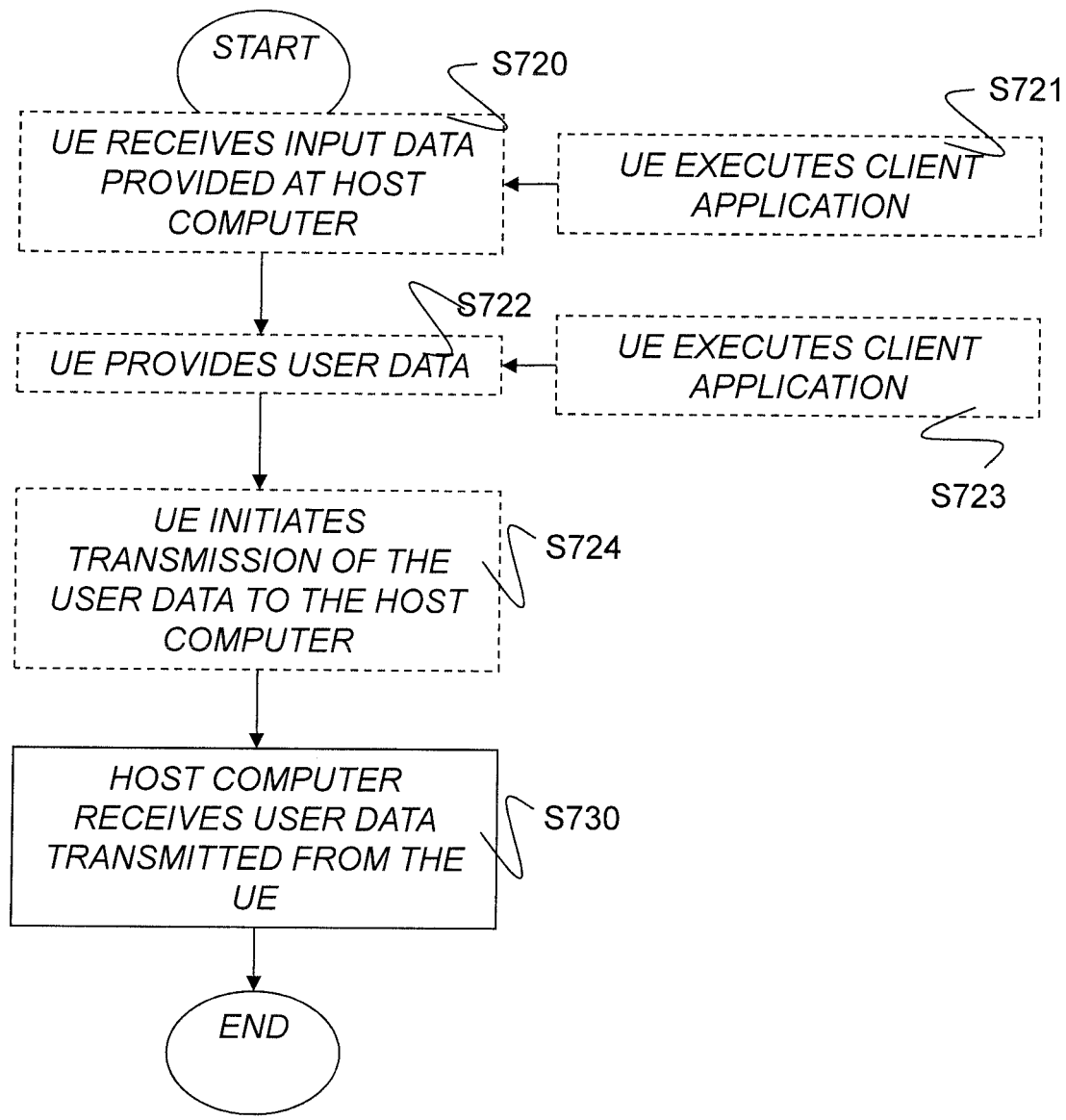

FIG. 29 is a flowchart illustrating a method implemented in a communication system, in accordance with one embodiment. The communication system includes a host computer, a base station and a UE which may be those described with reference to FIGS. 25 and 26. For simplicity of the present disclosure, only drawing references to FIG. 29 will be included in this section. In an optional first step S720 of the method, the UE receives input data provided by the host computer. Additionally or alternatively, in an optional second step S722, the UE provides user data. In an optional substep S723 of the second step S722, the UE provides the user data by executing a client application. In a further optional substep S721 of the first step S720, the UE executes a client application which provides the user data in reaction to the received input data provided by the host computer. In providing the user data, the executed client application may further consider user input received from the user. Regardless of the specific manner in which the user data was provided, the UE initiates, in an optional third substep S724, transmission of the user data to the host computer. In a fourth step S730 of the method, the host computer receives the user data transmitted from the UE, in accordance with the teachings of the embodiments described throughout this disclosure.

Figure 30:
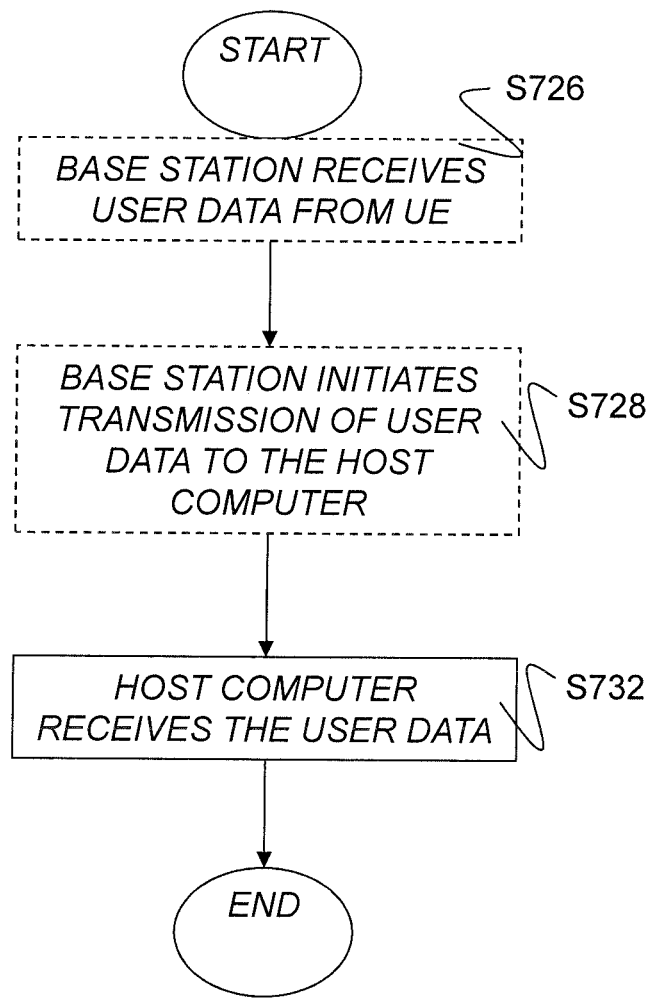

FIG. 30 is a flowchart illustrating a method implemented in a communication system, in accordance with one embodiment. The communication system includes a host computer, a base station and a UE which may be those described with reference to FIGS. 25 and 26. For simplicity of the present disclosure, only drawing references to FIG. 30 will be included in this section. In an optional first step S726 of the method, in accordance with the teachings of the embodiments described throughout this disclosure, the base station receives user data from the UE. In an optional second step S728, the base station initiates transmission of the received user data to the host computer. In a third step S732, the host computer receives the user data carried in the transmission initiated by the base station.

Numbered Embodiments

1. A network node configured to communicate with a wireless device, the network node comprising a radio interface and processing circuitry configured to provide signals for beam-formed transmission, wherein the network node is configured to retrieve, from a memory, first vector-associated data defined by an obtained first beam index, said first beam index being assigned to a first signal, said first signal being scheduled to be transmitted by beamforming in a first direction, said memory having stored therein vector-associated data characterizing at least two sets of beamforming vectors for each polarization and for each one of a plurality of beam directions, said at least two sets of beamforming vectors for each polarization and for each one of a plurality of directions presenting different tapering and/or non-tapering, whereby said first vector-associated data characterizing a first selected set of beamforming vectors, being designed to give a beam in said first direction, wherein said first beam index comprises information for defining vector-associated data characterizing a particular one of said at least two sets of beamforming vectors for said first direction, and wherein the network node is further configured to initiate a beamforming of said first signal by use of said vector-associated data characterizing said first selected set of beamforming vectors.

2. The network node of embodiment 1, wherein the network node is a base station.

3. A communication system including a host computer comprising processing circuitry configured to provide user data, and a communication interface configured to forward the user data to a cellular network for transmission to a wireless device, wherein the cellular network comprises a network node having a radio interface and processing circuitry, the processing circuitry of the network node being configured to provide signals for beam-formed transmission, wherein the network node is configured to retrieve, from a memory, first vector-associated data defined by an obtained first beam index, said first beam index being assigned to a first signal, said first signal being scheduled to be transmitted by beamforming in a first direction, said memory having stored therein vector-associated data characterizing at least two sets of beamforming vectors for each polarization and for each one of a plurality of beam directions, said at least two sets of beamforming vectors for each polarization and for each one of a plurality of directions presenting different tapering and/or non-tapering, whereby said first vector-associated data characterizing a first selected set of beamforming vectors, being designed to give a beam in said first direction, wherein said first beam index comprises information for defining vector-associated data characterizing a particular one of said at least two sets of beamforming vectors for said first direction, and wherein the network node is further configured to initiate a beamforming of said first signal by use of said vector-associated data characterizing said first selected set of beamforming vectors.

4. The communication system of embodiment 3, further including the network node.

5. The communication system of embodiment 4, further including the wireless device, wherein the wireless device is configured to communicate with the network node.

6. The communication system of embodiment 5, wherein:
the processing circuitry of the host computer is configured to execute a host application, thereby providing the user data; and
the wireless device comprises processing circuitry configured to execute a client application associated with the host application.

7. The communication system of any of the embodiments 3 to 6, wherein the wireless device is a user equipment.

8. The communication system of any of the embodiments 3 to 7, wherein the network node is a base station.

9. A network node configured to communicate with a wireless device, the network node comprising a radio interface and processing circuitry configured to schedule signals for beamformed transmission, wherein the network node is configured to select a first set of beamforming vectors among at least two first sets of beamforming vectors, said first set of beamforming vectors corresponding to a highest estimated total throughput for a first signal to be scheduled for beamformed transmission in a first direction under intended prevailing radio conditions, said at least two first sets of beamforming vectors being designed to give a beam in said first direction for a given polarization, said at least two first sets of beamforming vectors presenting different tapering and/or non-tapering, and wherein the network node is further configured to initiate a transmission of a first beam index assigned to said first signal, wherein said first beam index defines said first selected set of beamforming vectors.

10. The network node of embodiment 9, wherein the network node is a base station.

11. A communication system including a host computer comprising processing circuitry configured to provide user data, and a communication interface configured to forward the user data to a cellular network for transmission to a wireless device, wherein the cellular network comprises a network node having a radio interface and processing circuitry, the processing circuitry of the network node being configured to schedule signals for beamformed transmission, wherein the network node is configured to select a first set of beamforming vectors among at least two first sets of beamforming vectors, said first set of beamforming vectors corresponding to a highest estimated total throughput for a first signal to be scheduled for beamformed transmission in a first direction under intended prevailing radio conditions, said at least two first sets of beamforming vectors being designed to give a beam in said first direction for a given polarization, said at least two first sets of beamforming vectors presenting different tapering and/or non-tapering, and wherein the network node is further configured to initiate a transmission of a first beam index assigned to said first signal, wherein said first beam index defines said first selected set of beamforming vectors.

12. The communication system of embodiment 11, further including the network node.

13. The communication system of embodiment 12, further including the wireless device, wherein the wireless device is configured to communicate with the network node.

14. The communication system of embodiment 13, wherein:
the processing circuitry of the host computer is configured to execute a host application, thereby providing the user data; and
the wireless device comprises processing circuitry configured to execute a client application associated with the host application.

15. The communication system of any of the embodiments 12 to 14, wherein the wireless device is a user equipment.

16. The communication system of any of the embodiments 12 to 15, wherein the network node is a base station.

17. A method implemented in a network node, comprising retrieving, from a memory, first vector-associated data defined by an obtained first beam index, said first beam index being assigned to a first signal, said first signal being scheduled to be transmitted by beamforming in a first direction, said memory having stored therein vector-associated data characterizing at least two sets of beamforming vectors for each polarization and for each one of a plurality of beam directions, said at least two sets of beamforming vectors for each polarization and for each one of a plurality of directions presenting different tapering and/or non-tapering, whereby said first vector-associated data characterizing a first selected set of beamforming vectors, being designed to give a beam in said first direction, wherein said first beam index comprises information for defining vector-associated data characterizing a particular one of said at least two sets of beamforming vectors for said first direction, and initiating a beamforming of said first signal by use of said first vector-associated data characterizing said first selected set of beamforming vectors.

18. A method implemented in a communication system including a host computer, a network node and a wireless device, the method comprising at the host computer, providing user data, and at the host computer, initiating a transmission carrying the user data to the wireless device via a cellular network comprising the network node, wherein the network node retrieves, from a memory, first vector-associated data defined by an obtained first beam index, said first beam index being assigned to a first signal, said first signal being scheduled to be transmitted by beamforming in a first direction, said memory having stored therein vector-associated data characterizing at least two sets of beamforming vectors for each polarization and for each one of a plurality of beam directions, said at least two sets of beamforming vectors for each polarization and for each one of a plurality of directions presenting different tapering and/or non-tapering, whereby said first vector-associated data characterizing a first selected set of beamforming vectors, being designed to give a beam in said first direction, wherein said first beam index comprises information for defining vector-associated data characterizing a particular one of said at least two sets of beamforming vectors for said first direction, and initiates a beamforming of said first signal by use of said first vector-associated data characterizing said first selected set of beamforming vectors.

19. The method of embodiment 18, further comprising:
at the network node, transmitting the user data.

20. The method of embodiment 19, wherein the user data is provided at the host computer by executing a host application, the method further comprising:
at the wireless device, executing a client application associated with the host application.

21. The method of any of the embodiments 18 to 20, wherein the wireless device is a user equipment.

22. The method of any of the embodiments 17 to 21, wherein the network node is a base station.

23. A method implemented in a network node, comprising selecting a first set of beamforming vectors among at least two first sets of beamforming vectors, said first set of beamforming vectors corresponding to a highest estimated total throughput for a first signal to be scheduled for beamformed transmission in a first direction under intended prevailing radio conditions, said at least two first sets of beamforming vectors being designed to give a beam in said first direction for a given polarization, said at least two first sets of beamforming vectors presenting different tapering and/or non-tapering, and initiating a transmission of a first beam index assigned to said first signal, wherein said first beam index defines said first selected set of beamforming vectors.

24. A method implemented in a communication system including a host computer, a network node and a wireless device, the method comprising at the host computer, providing user data, and at the host computer, initiating a transmission carrying the user data to the wireless device via a cellular network comprising the network node, wherein the network node selects a first set of beamforming vectors among at least two first sets of beamforming vectors, said first set of beamforming vectors corresponding to a highest estimated total throughput for a first signal to be scheduled for beamformed transmission in a first direction under intended prevailing radio conditions, said at least two first sets of beamforming vectors being designed to give a beam in said first direction for a given polarization, said at least two first sets of beamforming vectors presenting different tapering and/or non-tapering, and initiates a transmission of a first beam index assigned to said first signal, wherein said first beam index defines said first selected set of beamforming vectors.

25. The method of embodiment 24, further comprising:
at the network node, transmitting the user data.

26. The method of embodiment 25, wherein the user data is provided at the host computer by executing a host application, the method further comprising:
at the wireless device, executing a client application associated with the host application.

27. The method of any of the embodiments 24 to 26, wherein the wireless device is a user equipment.

28. The method of any of the embodiments 23 to 27, wherein the network node is a base station.

29. A wireless device configured to communicate with a network node, the wireless device comprising a radio interface and processing circuitry configured to retrieve, from a memory, first vector-associated data defined by an obtained first beam index, said first beam index being assigned to a first signal, said first signal being scheduled to be received by beamforming from a first direction, said memory having stored therein vector-associated data characterizing at least two sets of beamforming vectors for each polarization and for each one of a plurality of beam directions, said at least two sets of beamforming vectors for each polarization and for each one of a plurality of directions presenting different tapering and/or non-tapering, whereby said first vector-associated data characterizing a first selected set of beamforming vectors, being designed to give a beam in said first direction, wherein said first beam index comprises information for defining vector-associated data characterizing a particular one of said at least two sets of beamforming vectors for said first direction, and to initiate a beamforming for said first signal by use of said first vector-associated data characterizing said first selected set of beamforming vectors.

30. The wireless device of embodiment 29, wherein the wireless device is a user equipment.

31. A communication system including a host computer comprising:
processing circuitry configured to provide user data; and
a communication interface configured to forward user data to a cellular network for transmission to a wireless device,
wherein the wireless device comprises a radio interface and processing circuitry, the processing circuitry of the wireless device being configured to retrieve, from a memory, first vector-associated data defined by an obtained first beam index, said first beam index being assigned to a first signal, said first signal being scheduled to be received by beamforming from a first direction, said memory having stored therein vector-associated data characterizing at least two sets of beamforming vectors for each polarization and for each one of a plurality of beam directions, said at least two sets of beamforming vectors for each polarization and for each one of a plurality of directions presenting different tapering and/or non-tapering, whereby said first vector-associated data characterizing a first selected set of beamforming vectors, being designed to give a beam in said first direction, wherein said first beam index comprises information for defining vector-associated data characterizing a particular one of said at least two sets of beamforming vectors for said first direction, and to initiate a beamforming for said first signal by use of said first vector-associated data characterizing said first selected set of beamforming vectors.

32. The communication system of embodiment 31, further including the wireless device.

33. The communication system of embodiment 32, wherein the cellular network further includes a network node configured to communicate with the wireless device.

34. The communication system of embodiment 33, wherein the network node is a base station.

35. The communication system of any of the embodiments 31 to 34, wherein:
the processing circuitry of the host computer is configured to execute a host application, thereby providing the user data; and
the processing circuitry of the wireless device is configured to execute a client application associated with the host application.

36. The communication system of any of the embodiments 31 to 35, wherein the wireless device is a user equipment.

37. A wireless device configured to communicate with a network node, the wireless device comprising a radio interface and processing circuitry configured to select a first set of beamforming vectors among at least two first sets of beamforming vectors, said first set of beamforming vectors corresponding to a highest estimated total throughput for a first signal to be scheduled for beamformed reception from a first direction under intended prevailing radio conditions, said at least two first sets of beamforming vectors being designed to give a beam in said first direction for a given polarization, said at least two first sets of beamforming vectors presenting different tapering and/or non-tapering, and to initiating a transmission of a first beam index assigned to said first signal, wherein said first beam index defines said first selected set of beamforming vectors.

38. The wireless device of embodiment 37, wherein the wireless device is a user equipment.

39. A communication system including a host computer comprising:
  processing circuitry configured to provide user data; and
  a communication interface configured to forward user data to a cellular network for transmission to a wireless device,
  wherein the wireless device comprises a radio interface and processing circuitry, the processing circuitry of the wireless device being configured to select a first set of beamforming vectors among at least two first sets of beamforming vectors, said first set of beamforming vectors corresponding to a highest estimated total throughput for a first signal to be scheduled for beamformed reception from a first direction under intended prevailing radio conditions, said at least two first sets of beamforming vectors being designed to give a beam in said first direction for a given polarization, said at least two first sets of beamforming vectors presenting different tapering and/or non-tapering, and to initiating a transmission of a first beam index assigned to said first signal, wherein said first beam index defines said first selected set of beamforming vectors.

40. The communication system of embodiment 39, further including the wireless device.

41. The communication system of embodiment 40, wherein the cellular network further includes a network node configured to communicate with the wireless device.

42. The communication system of embodiment 41, wherein the network node is a base station.

43. The communication system of any of the embodiments 39 to 42, wherein:
  the processing circuitry of the host computer is configured to execute a host application, thereby providing the user data; and
  the processing circuitry of the wireless device is configured to execute a client application associated with the host application.

44. The communication system of any of the embodiments 39 to 43, wherein the wireless device is a user equipment.

45. A method implemented in a wireless device, comprising:
  retrieving, from a memory, first vector-associated data defined by an obtained first beam index;
  said first beam index being assigned to a first signal;
  said first signal being scheduled to be received by beamforming from a first direction;
  said memory having stored therein vector-associated data characterizing at least two sets of beamforming vectors for each polarization and for each one of a plurality of beam directions;
  said at least two sets of beamforming vectors for each polarization and for each one of a plurality of directions presenting different tapering and/or non-tapering;
  whereby said first vector-associated data characterizing a first selected set of beamforming vectors, being designed to give a beam in said first direction;
  wherein said first beam index comprises information for defining vector-associated data characterizing a particular one of said at least two sets of beamforming vectors for said first direction; and
  initiating a beamforming for said first signal by use of said first vector-associated data characterizing said first selected set of beamforming vectors.

46. A method implemented in a communication system including a host computer, a network node and a wireless device, the method comprising:
  at the host computer, providing user data; and
  at the host computer, initiating a transmission carrying the user data to the wireless device via a cellular network comprising the network node, wherein the wireless device performs:
    retrieving, from a memory, first vector-associated data defined by an obtained first beam index;
    said first beam index being assigned to a first signal;
    said first signal being scheduled to be received by beamforming from a first direction;
    said memory having stored therein vector-associated data characterizing at least two sets of beamforming vectors for each polarization and for each one of a plurality of beam directions;
    said at least two sets of beamforming vectors for each polarization and for each one of a plurality of directions presenting different tapering and/or non-tapering;
    whereby said first vector-associated data characterizing a first selected set of beamforming vectors, being designed to give a beam in said first direction;
    wherein said first beam index comprises information for defining vector-associated data characterizing a particular one of said at least two sets of beamforming vectors for said first direction; and
    initiating a beamforming for said first signal by use of said first vector-associated data characterizing said first selected set of beamforming vectors.

47. The method of embodiment 46, further comprising:
  at the wireless device, receiving the user data from the network node.

48. The method of embodiment 46 or 47, wherein the network node is a base station.

49. The method of any of the embodiments 45 to 48, wherein the wireless device is a user equipment.

50. A method implemented in a wireless device, comprising:
  selecting a first set of beamforming vectors among at least two first sets of beamforming vectors, said first set of beamforming vectors corresponding to a highest estimated total throughput for a first signal to be scheduled for beamformed reception from a first direction under intended prevailing radio conditions;
  said at least two first sets of beamforming vectors being designed to give a beam in said first direction for a given polarization;
  said at least two first sets of beamforming vectors presenting different tapering and/or non-tapering; and initiating a transmission of a first beam index assigned to said first signal;
wherein said first beam index defines said first selected set of beamforming vectors.

51. A method implemented in a communication system including a host computer, a network node and a wireless device, the method comprising:
at the host computer, providing user data; and
at the host computer, initiating a transmission carrying the user data to the wireless device via a cellular network comprising the network node, wherein the network node performs:
selecting a first set of beamforming vectors among at least two first sets of beamforming vectors, said first set of beamforming vectors corresponding to a highest estimated total throughput for a first signal to be scheduled for beamformed reception from a first direction under intended prevailing radio conditions;
said at least two first sets of beamforming vectors being designed to give a beam in said first direction for a given polarization;
said at least two first sets of beamforming vectors presenting different tapering and/or non-tapering; and
initiating a transmission of a first beam index assigned to said first signal;
wherein said first beam index defines said first selected set of beamforming vectors.

52. The method of embodiment 51, further comprising:
at the wireless device, receiving the user data from the network node.

53. The method of embodiment 51 or 52, wherein the network node is a base station.

54. The method of any of the embodiments 50 to 53, wherein the wireless device is a user equipment.

55. A wireless device configured to communicate with a network node, the wireless device comprising a radio interface and processing circuitry configured to provide signals for beam-formed transmission, wherein the wireless device is configured to retrieve, from a memory, first vector-associated data defined by an obtained first beam index, said first beam index being assigned to a first signal, said first signal being scheduled to be transmitted by beamforming in a first direction, said memory having stored therein vector-associated data characterizing at least two sets of beamforming vectors for each polarization and for each one of a plurality of beam directions, said at least two sets of beamforming vectors for each polarization and for each one of a plurality of directions presenting different tapering and/or non-tapering, whereby said first vector-associated data characterizing a first selected set of beamforming vectors, being designed to give a beam in said first direction, wherein said first beam index comprises information for defining vector-associated data characterizing a particular one of said at least two sets of beamforming vectors for said first direction, and wherein the wireless device is further configured to initiate a beamforming of said first signal by use of said vector-associated data characterizing said first selected set of beamforming vectors.

56. The wireless device of embodiment 55, wherein the wireless device is a user equipment.

57. The wireless device of embodiment 55 or 56, wherein the network node is a base station.

58. A communication system including a host computer comprising:
a communication interface configured to receive user data originating from a transmission from a wireless device to a network node,
wherein the wireless device comprises a radio interface and processing circuitry, the processing circuitry of the wireless device being configured to provide signals for beam-formed transmission, wherein the wireless device is configured to retrieve, from a memory, first vector-associated data defined by an obtained first beam index, said first beam index being assigned to a first signal, said first signal being scheduled to be transmitted by beamforming in a first direction, said memory having stored therein vector-associated data characterizing at least two sets of beamforming vectors for each polarization and for each one of a plurality of beam directions, said at least two sets of beamforming vectors for each polarization and for each one of a plurality of directions presenting different tapering and/or non-tapering, whereby said first vector-associated data characterizing a first selected set of beamforming vectors, being designed to give a beam in said first direction, wherein said first beam index comprises information for defining vector-associated data characterizing a particular one of said at least two sets of beamforming vectors for said first direction, and wherein the wireless device is further configured to initiate a beamforming of said first signal by use of said vector-associated data characterizing said first selected set of beamforming vectors.

59. The communication system of embodiment 58, further including the wireless device.

60. The communication system of embodiment 59, further including the network node, wherein the network node comprises a radio interface configured to communicate with the wireless device and a communication interface configured to forward to the host computer the user data carried by a transmission from the wireless device to the network node.

61. The communication system of embodiment 59 or 60, wherein:
the processing circuitry of the host computer is configured to execute a host application; and
the processing circuitry of the wireless device is configured to execute a client application associated with the host application, thereby providing the user data.

62. The communication system of embodiment 59 or 60, wherein:
the processing circuitry of the host computer is configured to execute a host application, thereby providing request data; and
the processing circuitry of the wireless device is configured to execute a client application associated with the host application, thereby providing the user data in response to the request data.

63. The communication system of any of the embodiments 58 to 62, wherein the wireless device is a user equipment.

64. The communication system of any of the embodiments 58 to 63, wherein the network node is a base station.

65. A wireless device configured to communicate with a network node, the wireless device comprising a radio interface and processing circuitry configured to schedule signals for beamformed transmission, wherein the wireless device is configured to select a first set of beamforming vectors among at least two first sets of beamforming vectors, said first set of beamforming vectors corresponding to a highest estimated total throughput for a first signal to be scheduled for beamformed transmission in a first direction under intended prevailing radio conditions, said at least two first sets of beamforming vectors being designed to give a beam in said first direction for a given polarization, said at least two first sets of beamforming vectors presenting different tapering and/or non-tapering, and wherein the wireless device is further configured to initiate a transmission of a first beam index assigned to said first signal, wherein said first beam index defines said first selected set of beamforming vectors.

66. The wireless device of embodiment 65, wherein the wireless device is a user equipment.

67. The wireless device of embodiment 65 or 66, wherein the network node is a base station.

68. A communication system including a host computer comprising:
   a communication interface configured to receive user data originating from a transmission from a wireless device to a network node,
   wherein the wireless device comprises a radio interface and processing circuitry, the processing circuitry of the wireless device being configured to schedule signals for beamformed transmission, wherein the wireless device is configured to select a first set of beamforming vectors among at least two first sets of beamforming vectors, said first set of beamforming vectors corresponding to a highest estimated total throughput for a first signal to be scheduled for beamformed transmission in a first direction under intended prevailing radio conditions, said at least two first sets of beamforming vectors being designed to give a beam in said first direction for a given polarization, said at least two first sets of beamforming vectors presenting different tapering and/or non-tapering, and wherein the wireless device is further configured to initiate a transmission of a first beam index assigned to said first signal, wherein said first beam index defines said first selected set of beamforming vectors.

69. The communication system of embodiment 68, further including the wireless device.

70. The communication system of embodiment 69, further including the network node, wherein the network node comprises a radio interface configured to communicate with the wireless device and a communication interface configured to forward to the host computer the user data carried by a transmission from the wireless device to the network node.

71. The communication system of embodiment 69 or 70, wherein:
   the processing circuitry of the host computer is configured to execute a host application; and
   the processing circuitry of the wireless device is configured to execute a client application associated with the host application, thereby providing the user data.

72. The communication system of embodiment 69 or 70, wherein:
   the processing circuitry of the host computer is configured to execute a host application, thereby providing request data; and
   the processing circuitry of the wireless device is configured to execute a client application associated with the host application, thereby providing the user data in response to the request data.

73. The communication system of any of the embodiments 68 to 72, wherein the wireless device is a user equipment.

74. The communication system of any of the embodiments 68 to 73, wherein the network node is a base station.

75. A method implemented in a wireless device, comprising retrieving, from a memory, first vector-associated data defined by an obtained first beam index, said first beam index being assigned to a first signal, said first signal being scheduled to be transmitted by beamforming in a first direction, said memory having stored therein vector-associated data characterizing at least two sets of beamforming vectors for each polarization and for each one of a plurality of beam directions, said at least two sets of beamforming vectors for each polarization and for each one of a plurality of directions presenting different tapering and/or non-tapering, whereby said first vector-associated data characterizing a first selected set of beamforming vectors, being designed to give a beam in said first direction, wherein said first beam index comprises information for defining vector-associated data characterizing a particular one of said at least two sets of beamforming vectors for said first direction, and initiating a beamforming of said first signal by use of said first vector-associated data characterizing said first selected set of beamforming vectors.

76. The method of embodiment 75, further comprising:
   providing user data; and
   forwarding the user data to a host computer via the transmission to a network node.

77. A method implemented in a communication system including a host computer, a network node and a wireless device, the method comprising:
   at the host computer, receiving user data transmitted to the network node from the wireless device, wherein the wireless device retrieving, from a memory, first vector-associated data defined by an obtained first beam index, said first beam index being assigned to a first signal, said first signal being scheduled to be transmitted by beamforming in a first direction, said memory having stored therein vector-associated data characterizing at least two sets of beamforming vectors for each polarization and for each one of a plurality of beam directions, said at least two sets of beamforming vectors for each polarization and for each one of a plurality of directions presenting different tapering and/or non-tapering, whereby said first vector-associated data characterizing a first selected set of beamforming vectors, being designed to give a beam in said first direction, wherein said first beam index comprises information for defining vector-associated data characterizing a particular one of said at least two sets of beamforming vectors for said first direction, and initiating a beamforming of said first signal by use of said first vector-associated data characterizing said first selected set of beamforming vectors.

78. The method of embodiment 77, further comprising:
   at the wireless device, providing the user data to the network node.

79. The method of embodiment 78, further comprising:
   at the wireless device, executing a client application, thereby providing the user data to be transmitted; and
   at the host computer, executing a host application associated with the client application.

80. The method of embodiment 78, further comprising:
   at the wireless device, executing a client application; and
   at the wireless device, receiving input data to the client application, the input data being provided at the host computer by executing a host application associated with the client application,
   wherein the user data to be transmitted is provided by the client application in response to the input data.

81. The method of any of the embodiments 76 to 80, wherein the network node is a base station.

82. The method of any of the embodiments 75 to 81, wherein the wireless device is a user equipment.

83. A method implemented in a wireless device, comprising selecting a first set of beamforming vectors among at least two first sets of beamforming vectors, said first set of beamforming vectors corresponding to a highest estimated total throughput for a first signal to be scheduled for beamformed transmission in a first direction under intended prevailing radio conditions, said at least two first sets of beamforming vectors being designed to give a beam in said first direction for a given polarization, said at least two first sets of beamforming vectors presenting different tapering and/or non-tapering, and initiating a transmission of a first beam index assigned to said first signal, wherein said first beam index defines said first selected set of beamforming vectors.

84. The method of embodiment 83, further comprising:
providing user data; and
forwarding the user data to a host computer via the transmission to a network node.

85. A method implemented in a communication system including a host computer, a network node and a wireless device, the method comprising:
at the host computer, receiving user data transmitted to the network node from the wireless device, wherein the wireless device selecting a first set of beamforming vectors among at least two first sets of beamforming vectors, said first set of beamforming vectors corresponding to a highest estimated total throughput for a first signal to be scheduled for beamformed transmission in a first direction under intended prevailing radio conditions, said at least two first sets of beamforming vectors being designed to give a beam in said first direction for a given polarization, said at least two first sets of beamforming vectors presenting different tapering and/or non-tapering, and initiating a transmission of a first beam index assigned to said first signal, wherein said first beam index defines said first selected set of beamforming vectors.

86. The method of embodiment 85, further comprising:
at the wireless device, providing the user data to the network node.

87. The method of embodiment 86, further comprising:
at the wireless device, executing a client application, thereby providing the user data to be transmitted; and
at the host computer, executing a host application associated with the client application.

88. The method of embodiment 86, further comprising:
at the wireless device, executing a client application; and
at the wireless device, receiving input data to the client application, the input data being provided at the host computer by executing a host application associated with the client application,
wherein the user data to be transmitted is provided by the client application in response to the input data.

89. The method of any of the embodiments 84 to 88, wherein the network node is a base station.

90. The method of any of the embodiments 83 to 89, wherein the wireless device is a user equipment.

91. A network node configured to communicate with a wireless device, the network node comprising a radio interface and processing circuitry configured to retrieve, from a memory, first vector-associated data defined by an obtained first beam index, said first beam index being assigned to a first signal, said first signal being scheduled to be received by beamforming from a first direction, said memory having stored therein vector-associated data characterizing at least two sets of beamforming vectors for each polarization and for each one of a plurality of beam directions, said at least two sets of beamforming vectors for each polarization and for each one of a plurality of directions presenting different tapering and/or non-tapering, whereby said first vector-associated data characterizing a first selected set of beamforming vectors, being designed to give a beam in said first direction, wherein said first beam index comprises information for defining vector-associated data characterizing a particular one of said at least two sets of beamforming vectors for said first direction, and to initiate a beamforming for said first signal by use of said first vector-associated data characterizing said first selected set of beamforming vectors.

92. The network node of embodiment 91, wherein the network node is a base station.

93. The network node of embodiment 91 or 92, wherein the wireless device is a user equipment.

94. A communication system including a host computer comprising a communication interface configured to receive user data originating from a transmission from a wireless device to a network node, wherein the network node comprises a radio interface and processing circuitry, the processing circuitry of the network node being configured to retrieve, from a memory, first vector-associated data defined by an obtained first beam index, said first beam index being assigned to a first signal, said first signal being scheduled to be received by beamforming from a first direction, said memory having stored therein vector-associated data characterizing at least two sets of beamforming vectors for each polarization and for each one of a plurality of beam directions, said at least two sets of beamforming vectors for each polarization and for each one of a plurality of directions presenting different tapering and/or non-tapering, whereby said first vector-associated data characterizing a first selected set of beamforming vectors, being designed to give a beam in said first direction, wherein said first beam index comprises information for defining vector-associated data characterizing a particular one of said at least two sets of beamforming vectors for said first direction, and to initiate a beamforming for said first signal by use of said first vector-associated data characterizing said first selected set of beamforming vectors.

95. The communication system of embodiment 94, further including the network node.

96. The communication system of embodiment 95, further including the wireless device, wherein the wireless device is configured to communicate with the network node.

97. The communication system of embodiment 96, wherein:
the processing circuitry of the host computer is configured to execute a host application;
the wireless device is configured to execute a client application associated with the host application, thereby providing the user data to be received by the host computer.

98. The communication system of any of the embodiments 94 to 97, wherein the network node is a base station.

99. The communication system of any of the embodiments 94 to 98, wherein the wireless device is a user equipment.

100. A network node configured to communicate with a wireless device, the network node comprising a radio interface and processing circuitry configured to select a first set of beamforming vectors among at least two first sets of beamforming vectors, said first set of beamforming vectors corresponding to a highest estimated total throughput for a first signal to be scheduled for beamformed reception from a first direction under intended prevailing radio conditions, said at least two first sets of beamforming vectors being designed to give a beam in said first direction for a given polarization, said at least two first sets of beamforming vectors presenting different tapering and/or non-tapering, and to initiating a transmission of a first beam index assigned to said first signal, wherein said first beam index defines said first selected set of beamforming vectors.

101. The network node of embodiment 100, wherein the network node is a base station.

102. The network node of embodiment 100 or 101, wherein the wireless device is a user equipment.

103. A communication system including a host computer comprising a communication interface configured to receive user data originating from a transmission from a wireless device to a network node, wherein the network node comprises a radio interface and processing circuitry, the processing circuitry of the network node being configured to select a first set of beamforming vectors among at least two first sets of beamforming vectors, said first set of beamforming vectors corresponding to a highest estimated total throughput for a first signal to be scheduled for beamformed reception from a first direction under intended prevailing radio conditions, said at least two first sets of beamforming vectors being designed to give a beam in said first direction for a given polarization, said at least two first sets of beamforming vectors presenting different tapering and/or non-tapering, and to initiating a transmission of a first beam index assigned to said first signal, wherein said first beam index defines said first selected set of beamforming vectors.

104. The communication system of embodiment 103, further including the network node.

105. The communication system of embodiment 104, further including the wireless device, wherein the wireless device is configured to communicate with the network node.

106. The communication system of embodiment 105, wherein:
the processing circuitry of the host computer is configured to execute a host application;
the wireless device is configured to execute a client application associated with the host application, thereby providing the user data to be received by the host computer.

107. The communication system of any of the embodiments 103 to 106, wherein the network node is a base station.

108. The communication system of any of the embodiments 103 to 107, wherein the wireless device is a user equipment.

109. A method implemented in a network node, comprising:
retrieving, from a memory, first vector-associated data defined by an obtained first beam index;
said first beam index being assigned to a first signal;
said first signal being scheduled to be received by beamforming from a first direction;
said memory having stored therein vector-associated data characterizing at least two sets of beamforming vectors for each polarization and for each one of a plurality of beam directions;
said at least two sets of beamforming vectors for each polarization and for each one of a plurality of directions presenting different tapering and/or non-tapering;
whereby said first vector-associated data characterizing a first selected set of beamforming vectors, being designed to give a beam in said first direction;
wherein said first beam index comprises information for defining vector-associated data characterizing a particular one of said at least two sets of beamforming vectors for said first direction; and
initiating a beamforming for said first signal by use of said first vector-associated data characterizing said first selected set of beamforming vectors.

110. A method implemented in a communication system including a host computer, a network node and a wireless device, the method comprising:
at the host computer, receiving, from the base station, user data originating from a transmission which the network node has received from the wireless device, wherein the network node performs:
retrieving, from a memory, first vector-associated data defined by an obtained first beam index;
said first beam index being assigned to a first signal;
said first signal being scheduled to be received by beamforming from a first direction;
said memory having stored therein vector-associated data characterizing at least two sets of beamforming vectors for each polarization and for each one of a plurality of beam directions;
said at least two sets of beamforming vectors for each polarization and for each one of a plurality of directions presenting different tapering and/or non-tapering;
whereby said first vector-associated data characterizing a first selected set of beamforming vectors, being designed to give a beam in said first direction;
wherein said first beam index comprises information for defining vector-associated data characterizing a particular one of said at least two sets of beamforming vectors for said first direction; and
initiating a beamforming for said first signal by use of said first vector-associated data characterizing said first selected set of beamforming vectors.

111. The method of embodiment 110, further comprising:
at the network node, receiving the user data from the wireless device.

112. The method of embodiment 111, further comprising:
at the network node, initiating a transmission of the received user data to the host computer.

113. The method of any of the embodiments 110 to 112, wherein the wireless device is a user equipment.

114. The method of any of the embodiments 109 to 113, wherein the network node is a base station.

115. A method implemented in a network node, comprising:
selecting a first set of beamforming vectors among at least two first sets of beamforming vectors, said first set of beamforming vectors corresponding to a highest estimated total throughput for a first signal to be scheduled for beamformed reception from a first direction under intended prevailing radio conditions;
said at least two first sets of beamforming vectors being designed to give a beam in said first direction for a given polarization;
said at least two first sets of beamforming vectors presenting different tapering and/or non-tapering; and
initiating a transmission of a first beam index assigned to said first signal;
wherein said first beam index defines said first selected set of beamforming vectors.

116. A method implemented in a communication system including a host computer, a network node and a wireless device, the method comprising:
at the host computer, receiving, from the base station, user data originating from a transmission which the network node has received from the wireless device, wherein the network node performs:
selecting a first set of beamforming vectors among at least two first sets of beamforming vectors, said first set of beamforming vectors corresponding to a highest estimated total throughput for a first signal to be scheduled for beamformed reception in a first direction under intended prevailing radio conditions;
said at least two first sets of beamforming vectors being designed to give a beam in said first direction for a given polarization;
said at least two first sets of beamforming vectors presenting different tapering and/or non-tapering; and
initiating a transmission of a first beam index assigned to said first signal;
wherein said first beam index defines said first selected set of beamforming vectors.

117. The method of embodiment 116, further comprising:
at the network node, receiving the user data from the wireless device.

118. The method of embodiment 117, further comprising:
at the network node, initiating a transmission of the received user data to the host computer.

119. The method of any of the embodiments 116 to 118, wherein the wireless device is a user equipment.

120. The method of any of the embodiments 115 to 119, wherein the network node is a base station.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

Abbreviations

3GPP 3$^{rd}$ Generation Partnership Project
ASIC Application Specific Integrated Circuits
BF BeamForming
BTS Base Transceiver Stations
CD Compact Disc
CN Core Network
COTS Common Off-The-Shelf
CPE Customer Premises Equipment
CPU Central Processing Units
DBF Digital BeamForming
DFT Discrete Fourier Transform
DL DownLink
DSP Digital Signal Processors
DU Digital Unit
DVD Digital Versatile Disc
EIRP Equivalent Isotropically Radiated Power
eNB evolved Node B
FPGA Field Programmable Gate Arrays
FWT Fixed Wireless Access Terminal
gNB New Radio Node B
HDD Hard Disk Drive
HW hardware
I/O input/output
LEE Laptop Embedded Equipment
LME Laptop Mounted Equipment
LUT Look-Up-Table
MEM memory units
MU-MIMO Multi-User Multiple-Input Multiple-Output
NB Node B
ND Network Device
NFV Network Function Virtualization
NI Network Interfaces
NIC Network Interface Controller
OFDM Orthogonal Frequency-Division Multiplexing
OS Operating System
OSS Operations and Support System
PA Power Amplifier
PC Personal Computer
PDA Personal Digital Assistant
PLC Programmable Logic Controllers
RAM Random Access Memory
RAN Radio Access Network
REG registers
RF Radio Frequency
ROM Read-Only Memory
RRU Remote Radio Units
SNR Signal-to-Noise Ratio
STA Station
SU-MIMO Single-User Multiple-Input Multiple-Output
SW software
UE User Equipment
USB Universal Serial Bus
VM Virtual Machine
VMM Virtual Machine Monitor
VNE Virtual Network Element
WNIC Wireless Network Interface Controller

REFERENCES

[1] Fredric J. Harris, "On the Use of Windows for Harmonic Analysis with the Discrete Fourier Transform", Proceedings of the IEEE, vol. 66, no. 1, January 1978.

The invention claimed is:
1. A method for providing signals for beamformed communication, wherein said method comprises the steps of:
retrieving, from a memory, first vector-associated data defined by an obtained first beam index;
said first beam index being assigned to a first signal;
said first signal being scheduled to be communicated by beamforming in a first direction;
said memory having stored therein vector-associated data characterizing at least two sets of beamforming vectors for each polarization and for each one of a plurality of beam directions;
said at least two sets of beamforming vectors for each polarization and for each one of a plurality of directions presenting different tapering and/or non-tapering;
whereby said first vector-associated data characterizing a first selected set of beamforming vectors, being designed to give a beam in said first direction;
wherein said first beam index comprises information for defining vector-associated data characterizing a particular one of said at least two sets of beamforming vectors for said first direction; and
initiating a beamforming for said first signal by use of said first vector-associated data characterizing said first selected set of beamforming vectors;
characterized in that said beam index has a part beam index defining a partition of said data characterizing said sets of beamforming vectors of said memory, which partition being associated with vector-associated data of only one set of beamforming vectors for each polarization and for each one of a plurality of directions.

2. The method according to claim 1, characterized by the further step of:
retrieving, from said memory, second vector-associated data defined by an obtained second beam index;
said second beam index being assigned to a second signal;
said second signal being scheduled to be communicated by beamforming in a second direction;
said second direction being different from said first direction;
said second signal being scheduled to be communicated simultaneously as said first signal by a same antenna using a same physical resource;
whereby said second vector-associated data characterizing a second selected set of beamforming vectors, being designed to give a beam in said second direction;
wherein said second beam index comprises information for defining vector-associated data characterizing a particular one of said at least two sets of beamforming vectors for said second direction; and
wherein said step of initiating a beamforming comprises initiating a multi-user beamforming for said first and second signals by use of said first and second vector-associated data characterizing said first and second selected sets of beamforming vectors.

3. The method according to claim 1, characterized in that said part beam index defines if the beamforming is a single-user beamforming or a multi-user beamforming.

4. The method according to claim 3, characterized in that a partition defined by a part beam index associated with a single-user beamforming comprises vector-associated data characterizing sets of beamforming vectors without tapering and a partition defined by a part beam index associated with a multi-user beamforming comprises vector-associated data characterizing sets of beamforming vectors with tapering.

5. The method according to claim 1, characterized in that said vector-associated data characterizing sets of beamforming vectors comprises data defining phase shifts and intensity modulation for each antenna element.

6. The method according to claim 5, characterized in that said vector-associated data characterizing said at least two sets of beamforming vectors has a common set of phase shifts for each direction and separate data defining different intensity modulations for said at least two sets of beamforming vectors.

7. The method according to claim 1, characterized by the further step of:
obtaining said first beam index by receiving said first beam index from a network node.

8. The method according to claim 7, wherein said step of obtaining also comprises obtaining of said second beam index by receiving said second beam index from a network node.

9. The method according to claim 1, characterized in that said beamformed communication is a beamformed transmission of signals.

10. The method according to claim 1, characterized in that said beamformed communication is a beamformed reception of signals.

11. The method according to claim 1, characterized in that said beamformed communication is a downlink communication.

12. The method according to claim 1, characterized in that said beamformed communication is an uplink communication.

13. The method according to claim 1, characterized in that said tapering is an amplitude tapering.

14. A method for scheduling signals for beam-formed communication, wherein said method comprises the steps of:
selecting a first set of beamforming vectors among at least two first sets of beamforming vectors, said first set of beamforming vectors corresponding to a highest estimated total throughput for a first signal to be scheduled for beamformed communication in a first direction under intended prevailing radio conditions;
said at least two first sets of beamforming vectors being designed to give a beam in said first direction for a given polarization;
said at least two first sets of beamforming vectors presenting different tapering and/or non-tapering; and
initiating a transmission of a first beam index assigned to said first signal;
wherein said first beam index defines said first selected set of beamforming vectors;
characterized in that said beam index has a part beam index defining if the beamforming is a single-user beamforming or a multi-user beamforming.

15. The method according to claim 14, characterized by the further steps of:
selecting a second set of beamforming vectors among at least two second sets of beamforming vectors, said second set of beamforming vectors corresponding to a highest estimated total throughput for said first signal and for a second signal to be scheduled for beamformed communication in said first direction and a second direction, respectively, under intended prevailing radio conditions;
said second direction being different from said first direction;
said second signal is scheduled for beamformed communication simultaneously as said first signal by a same antenna using a same physical resource;
said at least two second sets of beamforming vectors being designed to give a beam in said second direction for a given polarization;
said at least two second sets of beamforming vectors presenting different tapering and/or non-tapering; and
initiating a transmission of a second beam index assigned to said second signal;
wherein said second beam index defines said second selected set of beamforming vectors.

16. The method according to claim 14 characterized in that said single-user beamforming is a beamforming using beamforming vectors without tapering and said multi-user beamforming is a beamforming using beamforming vectors with tapering.

17. A radio frequency unit configured to provide signals for beamformed communication,
wherein the radio frequency unit is configured to retrieve, from a memory, first vector-associated data defined by an obtained first beam index;
said first beam index being assigned to a first signal;
said first signal being scheduled to be communicated by beamforming in a first direction;
said memory having stored therein vector-associated data characterizing at least two sets of beamforming vectors for each polarization and for each one of a plurality of beam directions;

said at least two sets of beamforming vectors for each polarization and for each one of a plurality of directions presenting different tapering and/or non-tapering;

whereby said first vector-associated data characterizing a first selected set of beamforming vectors, being designed to give a beam in said first direction;

wherein said first beam index comprises information for defining vector-associated data characterizing a particular one of said at least two sets of beamforming vectors for said first direction; and wherein the radio frequency unit is further configured to initiate a beamforming for said first signal by use of said vector-associated data characterizing said first selected set of beamforming vectors;

characterized in that said beam index has a part beam index defining a partition of said data characterizing said sets of beamforming vectors of said memory, which partition being associated with vector-associated data of only one set of beamforming vectors for each polarization and for each one of a plurality of directions.

18. A network node configured to schedule signals for beamformed communication, wherein the network node is configured to select a first set of beamforming vectors among at least two first sets of beamforming vectors, said first set of beamforming vectors corresponding to a highest estimated total throughput for a first signal to be scheduled for beamformed communication in a first direction under intended prevailing radio conditions;

said at least two first sets of beamforming vectors being designed to give a beam in said first direction for a given polarization;

said at least two first sets of beamforming vectors presenting different tapering and/or non-tapering; and wherein the network node is further configured to initiate a transmission of a first beam index assigned to said first signal;

wherein said first beam index defines said first selected set of beamforming vectors;

characterized in that said beam index has a part beam index defining if the beamforming is a single-user beamforming or a multi-user beamforming.

* * * * *